United States Patent [19]

LaDue et al.

[11] Patent Number: 5,847,962
[45] Date of Patent: Dec. 8, 1998

[54] DOCUMENT DISPENSER OPERATOR SECURITY OVERRIDE

[75] Inventors: Philip G. LaDue, Bellbrook; John H. King, Kettering; James M. Grywalski, West Carrollton, all of Ohio

[73] Assignee: The Standard Register Company, Dayton, Ohio

[21] Appl. No.: 583,221

[22] Filed: Jan. 4, 1996

[51] Int. Cl.[6] .................................................. G06F 17/00
[52] U.S. Cl. ........................ 364/479.07; 364/479.14; 235/382.5
[58] Field of Search ................... 364/479.01, 479.02, 364/479.03, 479.05, 479.07, 479.14; 379/102, 103, 106; 221/1, 7–9; 235/379, 381, 382, 382.5; 186/55, 56

[56] References Cited

U.S. PATENT DOCUMENTS

| | | | |
|---|---|---|---|
| 4,625,275 | 11/1986 | Smith | 364/401 |
| 5,053,607 | 10/1991 | Carlson et al. | 235/379 |
| 5,205,436 | 4/1993 | Savage | 364/479.01 |
| 5,461,372 | 10/1995 | Busak et al. | 340/825.31 |

Primary Examiner—Reba I. Elmore
Assistant Examiner—Thomas E. Brown
Attorney, Agent, or Firm—Killworth, Gottman, Hagan & Schaeff, L.L.P.

[57] ABSTRACT

A document dispensing system wherein any or all security levels in a document dispensing system are accessible upon issuance of a security controller override command so as to permit operation of the dispenser in a particular security mode without regard to whether a corresponding security passcode has been entered on the dispenser keyboard or otherwise.

20 Claims, 1 Drawing Sheet

DOCUMENT DISPENSER OPERATOR SECURITY OVERRIDE

BACKGROUND OF THE INVENTION

The present invention relates to document dispensing systems and, more particularly, to document dispensing systems incorporating multiple levels of operation, access to which is limited according to predetermined security limits.

In document dispensing systems, certain modes of operation may be accessed only upon entry of predetermined security codes on a system keyboard. For example, an operator mode and an executive mode may be established and a different passcode may be required for operation in each mode. The operator mode, accessible only upon entry of an operator passcode, may be utilized to designate specific information to be printed on the documents and to dispense the documents. The executive mode, accessible only upon entry of an executive passcode, may be used to specify how the dispenser will operate, e.g., setting passwords, clearing system memory, selecting output types for document formats, printing document samples, etc. The executive mode may also be utilized to specify that no passcodes be required for operation in the executive mode; however, even with this feature, it is still necessary to enter the executive mode, through the use of an executive passcode, in order to arrange the dispenser set up so that no passcodes are required.

It may be preferable for a document dispenser operator to be free to operate the dispenser without the operational constraints presented by multiple security levels of operation. Further, it may be preferable to activate a security level override on a permanent basis, for a predetermined amount of time, or for a specified number of security level entries. Similarly, it may be necessary to override a security passcode requirement for a single security level entry in the event the correct passcode is not available. Accordingly, there is a need for a document dispenser wherein any or all of a variety of operational security levels may be overridden or disabled to permit operation of the device without input of security passcodes.

SUMMARY OF THE INVENTION

This need is met by the present invention wherein a method and apparatus are provided for overriding or disabling any or all security levels in a document dispensing system so as to permit operation of the dispenser in a particular security mode without regard to whether a corresponding security passcode has been entered on the dispenser keyboard or otherwise.

In accordance with one embodiment the present invention, a document dispenser is provided comprising: a digital controller for controlling the operation of the dispenser; a document printer controlled by the digital controller; a security signal production device; a security controller adapted to permit operation of the dispenser in at least one security mode when a predetermined security signal is produced by the security signal production device, to inhibit operation of the dispenser in at least one security mode when a predetermined security signal is not produced by the security signal production device, and to permit operation of the dispenser in at least one security mode upon receipt of a security controller override command; and, a data input port adapted to receive the override command and to transfer the override command to the security controller.

The security controller may permit operation in a first security mode when a first security signal is produced by the production device, permit operation in a second security mode when a second security signal is produced by the production device, permit operation of the dispenser in the first security mode upon receipt of a first security controller override command, permit operation of the dispenser in the second security mode upon receipt of a second security controller override command, and permit operation of the dispenser in the first and second security modes upon receipt of a third security controller override command. Upon receipt of the override command, the security controller may permit a predetermined number of reentries into a selected security mode following a termination of operation in the selected security mode. Alternatively, upon receipt of the override command, the security controller permits entry into a selected security mode but does not permit reentry into the selected security mode following a termination of operation in the selected security mode.

The security controller may comprise an electronic memory device for storing a plurality of security level entry codes and for sending an operation signal output to the digital controller indicative of whether operation in a particular security level is to be permitted or inhibited. Further, the security controller may comprise electronic circuitry for sending an operation signal command to the digital controller permitting operation in a particular security level or a plurality of security levels in response to the security controller override command.

The data input port may comprise a communications port, including a serial port, a parallel port, or a telecommunications port. The security signal production device may comprise a mechanical or electronic component for producing or detecting an electronic signal and transferring the signal to the security controller. Specifically, the security signal production device may comprise a keyboard for entering a preselected key sequence, a decoder for reading an optically or magnetically encoded object carrying encoded information indicative of the security signal, a switch for producing the security signal in response to activation by a mechanically cut key, or a data input port for receiving the security signal and transferring the signal to the security controller.

The document dispenser may further comprise at least one security mode entry command producing device, whereby, when operation in a selected security mode is permitted, entry into the selected security mode is achieved by activating the entry command producing device. The command producing device may comprise a mechanical or electronic component capable of sending an electronic signal to the digital controller, e.g, a key on the dispenser keyboard.

In accordance with another embodiment the present invention, a method of dispensing documents comprises the steps of providing a document dispenser wherein access to at least one operational mode is controlled by a security controller, providing a command transfer device, and downloading a security controller override command from the command transfer device to the document dispenser to permit access to the at least one operational mode. The command transfer device may comprise a host computer.

In accordance with yet another embodiment the present invention, a method of dispensing documents comprises the steps of providing a document dispenser including a digital controller for controlling the operation of the dispenser and a document printer, providing a security signal production device, permitting operation of the dispenser in at least one security mode when a predetermined security signal is produced by the security signal production device, inhibiting operation of the dispenser in at least one security mode when the predetermined security signal is not produced by the security signal production device, and permitting operation of the dispenser in at least one security mode upon receipt of a security controller override command.

Accordingly, it is an object of the present invention to provide for security level override within a document dispensing system in response to, and in accordance with, the parameters of an override command received by the document dispenser.

DETAILED DESCRIPTION OF THE INVENTION

Figure 1:
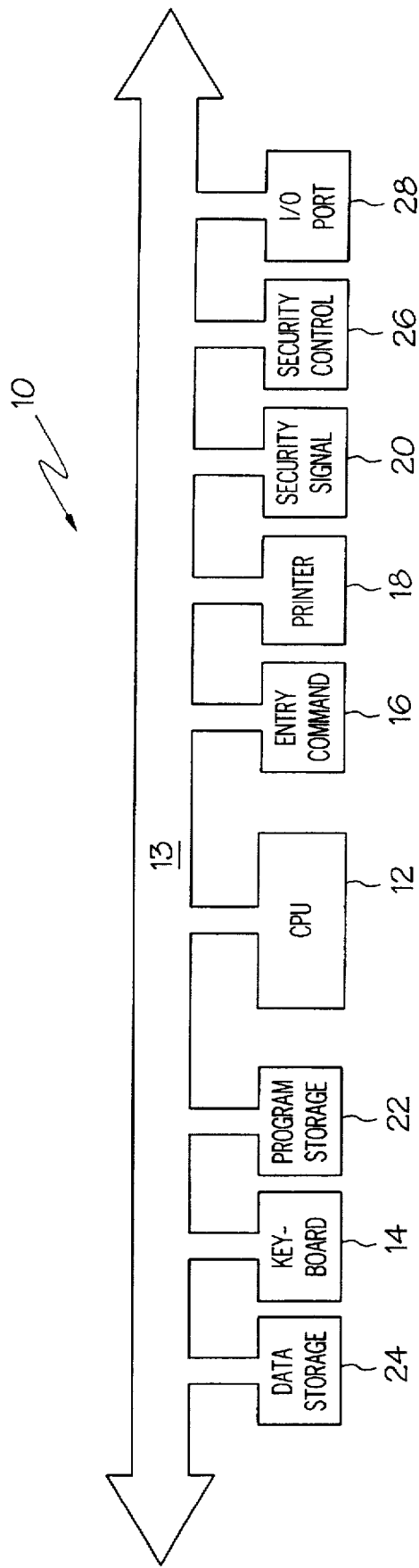
FIG. 1 is a block diagram of the electronic components of a document dispenser according to the present invention.

FIG. 1 illustrates the electronic components of the document dispenser 10. The overall operation of the dispenser 10 is controlled by a digital central processing unit (CPU) 12. The CPU, or digital controller 12, includes data, address, and control buses, represented generally by the bus 13. A dispenser keyboard 14, a security mode entry command producing device 16, a document printer 18, a security signal production device 20, a security controller 26, and an input/output (I/O) port 28 are connected to the CPU 12 and are controlled thereby according to various operating and applications programs resident in a digital program data storage device 22. The program storage device 22 is connected to the CPU 12 by the bus 13. The document dispenser 10 also includes digital data storage device 24 connected to the CPU 12 by the bus 13 for providing storage of data processed by the CPU 12. It is contemplated by the present invention that the program storage device 22 and the data storage device 24 may comprise a single digital data storage device.

The security mode entry command producing device 16 comprises a mechanical or electronic component capable of sending an electronic signal to the digital controller to initiate a security level, or security mode, entry sequence. The entry command producing device 16 is typically a key provided on a dispenser keyboard 14. Whether security mode entry is permitted, however, is regulated by security controller 26. When the entry command producing device 16 is activated, and operation in a selected security mode is permitted by the security controller 26, entry into the selected security mode is achieved.

The security controller 26 includes a memory device for storing a plurality of security level entry codes and for sending an operation signal output to the CPU 12 indicative of whether operation in a particular security level is to be permitted or inhibited according to whether a particular security level entry code has been input from the security signal production device 20. The security controller 26 also includes electronic circuitry which, in response to a security controller override command, sends an operation signal command to the digital controller 12 permitting operation in a particular security level or a plurality of security levels. The security controller override command is described in detail below.

The security signal production device 20 is a mechanical or electronic component capable of producing, detecting, or reading an electronic signal and transferring the signal to a security controller 26. Examples include: a keyboard for entering a preselected key sequence to produce the security signal; a decoder for reading an optically or magnetically encoded disk, card, or other object carrying encoded information which, when decoded, will produce the security signal; a switch operable to produce the security signal in response to activation by a mechanically cut key; and, a data input port for receiving the security signal and transferring the signal to the security controller 26.

To enter a selected access limited mode of operation in the dispenser 10, a dispenser operator must first initiate a security mode entry command with the security mode entry command producing device 16, e.g., by pressing an executive mode key on a dispenser keyboard 14. The operator must then produce a security signal corresponding to the selected mode of operation with the security signal production device 20, e.g., by entering an executive security code on the dispenser keyboard 14. If the security signal produced at the production device 20 correctly corresponds to the selected mode entry code saved in the security controller 26, the security controller 26 permits operation of the dispenser in the selected mode. If, however, the security signal does not correctly correspond to the entry code saved in the security controller 26, the security controller 26 inhibits operation of the dispenser 10 in the selected mode. If the operator cannot produce the correct security signal, operation in the selected security mode will not be possible unless a security controller override command is input to an I/O port 28 and sent to the security controller 26 via the bus 13. If the I/O port 28 receives a security controller override command, it will transfer the command to the security controller 26 and operation of the dispenser in the selected security mode will not be inhibited by the security controller 26.

It is contemplated by the present invention that the security controller override command may be sent to the CPU 12, the security controller 26, or any other circuit component which effectively controls the operation of the security controller 26 in accordance with the override command. Similarly, the security level entry codes may be stored in the security controller 26 or in another location accessible to the security controller 26, e.g., the program storage device 22 or an auxiliary memory device (not shown).

The security controller 26 is responsive to a variety of override commands. For example, the security controller 26 permits operation of the dispenser in a single selected security mode or a plurality of selected security modes depending upon the particular parameters of the override command. Further, upon issuance of an override command specifying a predetermined reentry value, the security controller 26 permits a predetermined number of reentries into a selected security mode following a termination of operation in the selected security mode. The number of reentries permitted can be set to any preferred value, including zero. Finally, if a real time clock is coupled to the data bus 13, an override command specifying a predetermined effective override duration permits entry into a selected security mode or, if preferred, a plurality of selected security modes, for a predetermined amount of time.

The I/O port 28 is an RS-232 serial port, a telecommunications port, a parallel port, or any other electronic connection to a device capable of producing a command and sending the command to the dispenser.

Figure 2:
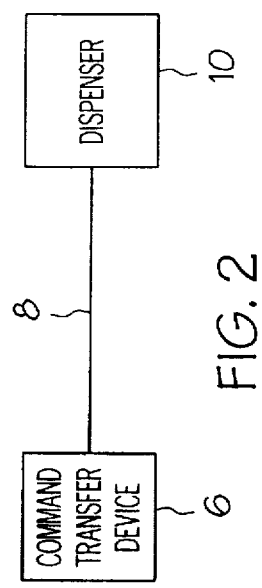
FIG. 2 is a block diagram of a document dispensing system according to the present invention.

As illustrated in FIG. 2, the override command originates from a command transfer device 6. The command transfer device 6 may be any computing device or signal generating device capable of producing and sending a signal to the document dispenser, e.g., a host computer or a telephone keypad. The generated override command is downloaded through a data link 8 to the dispenser 10. The data link may be any type of data carrying connector including a parallel data cable, an RS-232 serial cable, a telephone line, a fiber-optic data link, or an electromagnetic radiation transmitter/receiver data link. The command transfer 6 device may be locally connected to the dispenser 10 through, for example, an serial or parallel cable, or remotely connected to the dispenser 10 through, for example, a telecommunications connection.

It is contemplated by the present invention that a variety of document types may be produced by the document dispenser. Specifically, the dispenser may print out money orders, cashiers checks, gift certificates, security documents, data reports, and any other document requiring selection and placement of printed indicia thereon. It is also contemplated by the present invention that, instead of including the electronic memory device, the security controller 26 may be connected to a memory device which stores the security level entry codes. It is also contemplated by the present invention that the security controller 26 may be replaced by a limited security controller which does not include the electronic circuitry which sends the operation signal command to the digital controller. Rather, if the limited security controller is used in place of the security controller 26, the CPU 12, coupled to an override command memory device (not shown), responds to the security controller override command to permit operation in a particular security level or a plurality of security levels. It is further contemplated by the present invention that the memory devices identified herein may employ electronic, magnetic, magneto-optical, electro-optical, or optical data storage without departing from the scope of the present invention.

It is contemplated by the present invention that a variety of source codes may be utilized to enable downloading and processing of the security controller override command described herein. Listed below is an example of source code which enables downloading and processing of the security controller override command in a document dispenser in accordance with the present invention. The override command parameters presented below permit one entry into a low level executive mode, one entry into a high level executive mode, or entry into both the high and low level modes.

The global variable "exec_key_access" is a one byte value that holds the rights to an exec key which initiates an entry sequence into the executive mode. The global variables "EXEC_BUTTON" and "HI_EXEC_BUTTON" are one bit values set in "get_dsply_num." The global variable "BUTTON_SET" is a one bit value set in "exec_opt_21" of "opt20_25." The files 8032.h and 8032.c contain RAM addressing set up for "EXEC_BUTTON," "HI_EXEC_BUTTON," and "BUTTON_SET." The file "data.h" contains the RAM addressing set up and declaration for "exec_key_access." The file "isr.c" contains the code that processes all dispenser hardware interrupts. The code "timer0_isr" handles the machine's timer values and monitors time outs that occur when in the operator or executive mode and the key board is idle. The file "main.c" contains the idle state processing loop. The file "commfunc.c" interprets communication commands that may set the dispenser's operating characteristics and includes code for calling "do_byte_assignment" which places the next byte from the communications command "DNLOAD21D" into "exec_key_access." The file "general.c" contains the code that accepts and interprets key pad input and includes code that determines if the exec key has been pressed. If so, it must then be determined if "exec_key_access" has been set to allow entry into the low or high level executive mode. The file "execproc.c" contains the code that processes the executive mode operation. The file "opt20_25.c" contains code that handles the processing for operator passcodes, executive mode configuration, the system clock, timeout settings, the operator lockout period and change calculation.

Having described the invention in detail and by reference to preferred embodiments thereof, it will be apparent that modifications and variations are possible without departing from the scope of the invention defined in the appended claims.

```
/****************************************************
 * 8032.h -
 *
 ****************************************************/

/*
 * Initial revision
 */ sfr P0     = 0x80;    /* bit-addressable SFR space */
sfr TCON   = 0x88;
sfr P1     = 0x90;
sfr SCON   = 0x98;
sfr P2     = 0xA0;
sfr IE     = 0xA8;
sfr P3     = 0xB0;
sfr IP     = 0xB8;
sfr T2CON  = 0xC8;
sfr PSW    = 0xD0;
sfr ACC    = 0xE0;
sfr B      = 0xF0;

sfr SP     = 0x81;    /* other SFRs */
sfr DPL    = 0x82;
sfr DPH    = 0x83;
sfr PCON   = 0x87;    /* for uart 19.2 k baud, set to 0x80 */
sfr TMOD   = 0x89;
sfr TL0    = 0x8A;
sfr TL1    = 0x8B;
sfr TH0    = 0x8C;
sfr TH1    = 0x8D;
sfr SBUF   = 0x99;
sfr RCAP2L = 0xCA;
sfr RCAP2H = 0xCB;
sfr TL2    = 0xCC;
sfr TH2    = 0xCD;

/* 8032 Bit-addressable locations 80 through FF */ sbit TF1       = 0x8F;    /* TCON bits */
sbit TR1       = 0x8E;
sbit TF0       = 0x8D;
sbit TR0       = 0x8C;
sbit IE1       = 0x8B;
sbit IT1       = 0x8A;
sbit IE0       = 0x89;
sbit IT0       = 0x88;

sbit SM0       = 0x9F;    /* SCON bits */
sbit SM1       = 0x9E;
sbit SM2       = 0x9D;
sbit REN       = 0x9C;
sbit TB8       = 0x9B;
sbit RB8       = 0x9A;
sbit TI        = 0x99;
sbit RI        = 0x98;

sbit RS232_DSR     = 0x97;    /* P1 bits (all low true) */
sbit RS232_CTS     = 0x96;    /* UART Data Set Ready */
sbit RS232_DTR     = 0x95;    /* UART Clear To Send */
sbit LOW_EXEC_KEY  = 0x94;    /* UART Data Terminal Ready */
sbit HI_EXEC_KEY   = 0x93;
sbit DOORSW        = 0x92;    /* Door Switch or Flash Address 2 */
sbit BANK1         = 0x91;    /* Flash Address 1 */
sbit BANK0         = 0x90;    /* Flash Address 0 */ sbit EA        = 0xAF;    /* IE bits */
sbit ET2       = 0xAD;
sbit ES        = 0xAC;
sbit ET1       = 0xAB;
sbit EX1       = 0xAA;
```

```
06/16/1995  14:31        Filename: 8032.H                               Page 1 sbit    RT0       = 0xA9;
sbit    EX0       = 0xA8;

sbit    PT2       = 0xBD;         /* IP bits */
sbit    PS        = 0xBC;
sbit    PT1       = 0xBB;
sbit    PX1       = 0xBA;
sbit    PT0       = 0xB9;
sbit    PX0       = 0xB8;

sbit    RD        = 0xB7;         /* P3 bits */
sbit    WR        = 0xB6;
sbit    PFLASH    = 0xB5;
sbit    RS232_RTS = 0xB4;         /* UART Request To Send */
sbit    INT1      = 0xB3;         /* printer acknowledge interrupt */
sbit    UARTMOD   = 0xB2;         /* uart mode */
sbit    TXD       = 0xB1;         /* lister transmit */
sbit    PXD       = 0xB0;         /* lister bits */ sbit    TP2       = 0xCF;         /* TICON bits */
sbit    EXP2      = 0xCE;
sbit    RCLK      = 0xCD;
sbit    TCLK      = 0xCC;
sbit    EXEN2     = 0xCB;
sbit    TR2       = 0xCA;
sbit    T2        = 0xC9;
sbit    RL2       = 0xC8;

sbit    CY        = 0xD7;         /* PSW bits */
sbit    AC        = 0xD6;
sbit    F0        = 0xD5;         /* user flag 0 */
sbit    RS1       = 0xD4;
sbit    RS0       = 0xD3;
sbit    OV        = 0xD2;
sbit    F1        = 0xD1;         /* user flag 1 */
sbit    P         = 0xD0;

/*
 * The bit flags.  These values resided at bit locations 0x08 - 0x47
 * of the 4325....
 */
extern bit TXRDY;           /* UART transmitter ready */
extern bit PTRDY;           /* parallel printer ready */
extern bit CONNECT;         /* Used to tell that char's are recv'd - assume connect
                               attempt */
extern bit CKSUMERR;        /* check sum error in DNLOAD command */
extern bit UPDNDOC;         /* flag for upload / download untrans doc data */
extern bit KBDOUTOVR;       /* keyboard output buffer overflowed */
extern bit BINARY_COMM;     /* Used to suppress CR/LF translation */
extern bit COMMOUTOVR;      /* comm output buffer overflowed */ extern bit COMMACTIVE;      /* communication active */
extern bit RS232COMM;       /* RS-232 communications */
extern bit AUTODIAL_DONE;   /* autodial make it to connect */
extern bit AUTODIAL;        /* autodial active */
extern bit BUTTON_SET;      /* flag for exec/key access */
extern bit AUTOAN;          /* autoanswer active */
extern bit MANUALDIAL;      /* operator manual dial */
extern bit MANUALAN;        /* operator manual answer */
extern bit MODEMINIT;       /* modem initialized */ extern bit COMM_CHANGED;    /* Used to see if comm modes have changed since last 1
nit */
extern bit ALLCMD;          /* comm ALL command active */
extern bit REMOTEDBG;       /* debug report out comm port */

06/16/1995  14:31        Filename: 8032.H                               Page 4 extern bit AUTODAILY;       /* do autodaily report */
extern bit KEYPRESS;        /* key pressed */
extern bit REDIAL;          /* in autodial redial period */ extern bit AMEX;            /* AMEX machine */
extern bit TRAVELERS;       /* TRAVELERS machine */
extern bit TIMEOUT;         /* exec or op timeout has occurred */
extern bit LOCKOUT;         /* in operator lockout period */
extern bit LASTBLOCK;       /* last XMODEM block has been sent */
extern bit VOIDED;          /* voided document */
extern bit LOCKPROMPT;      /* at Comm Lock or Operator Lock prompt */
extern bit LOGOPEN;         /* printer door open message status */ extern bit KBDINFUL;        /* keyboard input buffer full */
extern bit KBDINEMP;        /* keyboard input buffer empty */
extern bit KBDOUTFUL;       /* keyboard output buffer full */
extern bit KBDOUTEMP;       /* keyboard output buffer empty */
extern bit COMMINFUL;       /* comm input buffer full */
extern bit COMMINEMP;       /* comm input buffer empty */
extern bit COMMOUTFUL;      /* comm output buffer full */
extern bit COMMOUTEMP;      /* comm output buffer empty */ extern bit PRINTER_ERROR;   /* printer error flag */
extern bit CONNCT_PENDING;  /* comm state pending flag */
extern bit EXIT_EXEC;       /* hi level exec mode flag */
extern bit JAM;
extern bit EXEC_BUTTON;     /* executive button pressed flag */
extern bit HI_EXEC_BUTTON;  /* high executive button pressed flag */
extern bit HI_EXECENTRY;    /* timer 2 used as seconds timer */
extern bit LOW_EXECENTRY;   /* timer 2 expired */ extern bit SEQMENU;         /* indicates that currently in SN seq prompt */
extern bit EXECENTRY;       /* exec mode entry flag */
extern bit NEWPROM;         /* detected new (different) prom version */
extern bit DOING_AUTODAILY; /* Used to insure NO RECURSION */
extern bit MEMERROR;        /* memory test error flag */
extern bit DISABLEANS;      /* disable modem auto-answer mode */
extern bit ENABLEANS;       /* enable modem auto-answer mode */
extern bit ADDRESSESC;      /* ESC from Debugging Enter Address prompt */ extern bit OPENOPLOCK;      /* open operator lockout window */
extern bit OPLOCK_MODE;     /* check the printer status flag */
extern bit LISTER_TIMEOUT_FLAG; /* Used if waiting on user during lister timeou
t */
extern bit CLEAR_MEM;       /* clear memory flag for set_dt_tm */
extern bit INIT_PROMPT;     /* initial prompt flag for {exec} */
extern bit FLAG_STAT;
extern bit HI_EXEC_SET;     /* hi_exec_key_access set flag */
extern bit TIME_PROMPT;     /* display time/date on bottom display line flag */

/**************************** END OF 8032.H ****************************/
```

```
06/16/1995  14:31       Filename: 8032.C                                                     Page  2

STD  617  PA                                       - 14 -

/*
 * The bit flags.  These values resided at bit locations 0x08 - 0x47
 * of the 4125...
 */ char bdata badd [8];

sbit  TXRDY          = badd[0] ^ 0;   /* UART transmitter ready */
sbit  PTRDY          = badd[0] ^ 1;   /* parallel printer ready */
sbit  CONNECT        = badd[0] ^ 2;   /* Used to tell chars recv'd - assume connect
attempt. */
sbit  CKSUMERR       = badd[0] ^ 3;   /* check sum error in DNLOAD command */
sbit  UPDNDOC        = badd[0] ^ 4;   /* Flag for upload / download untrans doc data
*/
sbit  KBDOUTOVR      = badd[0] ^ 5;   /* keyboard output buffer overflowed */
sbit  BINARY_COMM    = badd[0] ^ 6;   /* Used to surpress CRLF translation */
sbit  COMMOUTOVR     = badd[0] ^ 7;   /* comm output buffer overflowed */ sbit  COMMACTIVE     = badd[1] ^ 0;   /* communication active */
sbit  RS232COMM      = badd[1] ^ 1;   /* RS-232 communications */
sbit  AUTODIAL_DONE  = badd[1] ^ 2;   /* autodial made it to connect */
sbit  AUTODIAL       = badd[1] ^ 3;   /* autodial active */
sbit  AUTOAN         = badd[1] ^ 4;   /* autoanswer active */
sbit  MANUALDIAL     = badd[1] ^ 5;   /* operator manual dial */
sbit  MANUALAN       = badd[1] ^ 6;   /* operator manual answer */
sbit  MODEMINIT      = badd[1] ^ 7;   /* modem initialized */

/* sbit ??? = badd[2] ^ 0; */
sbit  COMM_CHANGED   = badd[2] ^ 1;   /* Used to see if comm modes have changed since
 last init */
sbit  ALLCMD         = badd[2] ^ 2;   /* comm ALL command active */
sbit  REMOTEDBG      = badd[2] ^ 3;   /* debug report out comm port */
sbit  AUTODAILY      = badd[2] ^ 4;   /* do autodaily report */
sbit  BUTTON_SET     = badd[2] ^ 5;   /* flag for exec_key_access */
sbit  KEYPRESS       = badd[2] ^ 6;   /* key pressed */
sbit  REDIAL         = badd[2] ^ 7;   /* in autodial redial period */ sbit  AMEX           = badd[3] ^ 0;   /* AMEX machine */
sbit  TRAVELERS      = badd[3] ^ 1;   /* TRAVELERS machine */
sbit  TIMEOUT        = badd[3] ^ 2;   /* exec or op timeout has occurred */
sbit  LOCKOUT        = badd[3] ^ 3;   /* in operator lockout period */
sbit  LASTBLOCK      = badd[3] ^ 4;   /* last XMODEM block has been sent */
sbit  VOIDED         = badd[3] ^ 5;   /* voided document */
sbit  LOCKPROMPT     = badd[3] ^ 6;   /* at Comm Lock or Operator Lock prompt */
sbit  DOOROPEN       = badd[3] ^ 7;   /* printer door open message status */ sbit  KBDINFUL       = badd[4] ^ 0;   /* keyboard input buffer full */
sbit  KBDINEMP       = badd[4] ^ 1;   /* keyboard input buffer empty */
sbit  KBDOUTFUL      = badd[4] ^ 2;   /* keyboard output buffer full */
sbit  KBDOUTEMP      = badd[4] ^ 3;   /* keyboard output buffer empty */
sbit  COMMINFUL      = badd[4] ^ 4;   /* comm input buffer full */
sbit  COMMINEMP      = badd[4] ^ 5;   /* comm input buffer empty */
sbit  COMMOUTFUL     = badd[4] ^ 6;   /* comm output buffer full */
sbit  COMMOUTEMP     = badd[4] ^ 7;   /* comm output buffer empty */ sbit  PRINTER_ERROR  = badd[5] ^ 0;   /* printer error flag */
sbit  CONNECT_PENDING = badd[5] ^ 1;  /* comm. state pending flag */
sbit  EXIT_EXEC      = badd[5] ^ 2;   /* hi level exec mode flag */
sbit  JAM            = badd[5] ^ 3;
sbit  EXEC_BUTTON    = badd[5] ^ 4;   /* executive button pressed flag */
sbit  HI_EXEC_BUTTON = badd[5] ^ 5;   /* hi executive button pressed flag */
sbit  HI_EXECENTRY   = badd[5] ^ 6;   /* hi level exec entry flag */
sbit  LOW_EXECENTRY  = badd[5] ^ 7;   /* low level exec entry flag */ sbit  SSQMENU        = badd[6] ^ 0;   /* indicates that currently in SN seq prompt */
```

STD 617 PA                                          - 15 -

```
06/16/1995 14:31        Filename: 8032.C                                               Page   3 sbit    EXECENTRY      = badd[6] ^ 1;     /* exec mode entry flag */
sbit    NEWPROM        = badd[6] ^ 2;     /* detected new (different) prom version */
sbit    DOING_AUTODAILY = badd[6] ^ 3;    /* Used to insure NO RECURSION */
sbit    MEMERROR       = badd[6] ^ 4;     /* memory test error flag */
sbit    DISABLEANS     = badd[6] ^ 5;     /* disable modem auto-answer mode */
sbit    ENABLEANS      = badd[6] ^ 6;     /* enable modem auto-answer mode */
sbit    ADDRESSESC     = badd[6] ^ 7;     /* ESC from Debugging Enter Address prompt */ sbit    OPENOPLOCK     = badd[7] ^ 0;     /* open operator lockout window */
sbit    OPLOCK_MODE    = badd[7] ^ 1;     /* check the printer status flag */
sbit    LISTER_TIMEOUT_FLAG = badd[7] ^ 2; /* Used if waiting on user during lister timeout */
sbit    CLEAR_MEM      = badd[7] ^ 3;     /* clear memory flag for set_dt_tm */
sbit    INIT_PROMPT    = badd[7] ^ 4;     /* initial prompt flag for [exec] */
sbit    FLSH_STAT      = badd[7] ^ 5;
sbit    HI_KEY_SET     = badd[7] ^ 6;     /* hi_exec_key_access set flag */
sbit    TIME_PROMPT    = badd[7] ^ 7;

/*************************** END OF 8032.C *************************************/
```

STD 617 PA  - 16 -

```
Filename: DATA.H data.h - ifndef _INC_DATA
define _INC_DATA include "struct.h"
include "io.h"
#include "const.h"
include "constdat.h"

/***************************************************************
** The following defines are used to setup either instantiation or
** declarations of system wide variables based on IN_MAIN.
**
** IN_MAIN will be defined by the "root" program, this will cause
**   PRE to be blank (ie. no extern which will instantiate the variable;
**   POST will be what ever is stated inside it's ()'s.
**
** For everyone else (ie. NON_MAIN) :
**   PRE will be "extern" causing declarations that can be used by other
**     modules.
**   POST will be blank.
**
** New variables added SHOULD follow this practice to avoid the bother of
** keeping track of two sets of variables (one for instat. and one for
** declar.
***************************************************************/
#ifdef IN_MAIN
#define _PRE_DECLARE
#define _POST_DECLARE(x) x
```

STD 617 PA                                              - 17 -

```
04/07/1995 12:47      Filename: DATA.H                Page 3          04/07/1995 12:47      Filename: DATA.H                Page 4 else                                                                 cument record */
define _PRE_DECLARE extern
#define _POST_DECLARE(x)                                              /**
#endif                                                                 ** ADD ANY DOC DATA ABOVE THIS LINE !!!
                                                                       **/
/***************************************************                  _PRE_DECLARE union doc *rtext_doc _POST_DECLARE();      /* Document pointer
 ** WARNING!!!                                                        for doc printing */
 ** The following declarations are for the document data and
 ** NOTHING else.  If you need to add a document data variable,        /****************************************************
 ** you must also make the appropriate change to the                    **        END OF DOCUMENT DATA DECLARATIONS!!!
 ** clear_doc memory() routine to allow for the size change             ****************************************************/
 ** if you simply want to add a common variable then do so
 ** after the document data declarations.  (look for document          _PRE_DECLARE byte special_function _POST_DECLARE();    /* Special FUNCTION configur
 **     data end comment....)                                         ation */
 ***************************************************/                 _PRE_DECLARE byte current_pos _POST_DECLARE();         /* current position of optio
                                                                      n pointer */
_PRE_DECLARE union doc doc_rec[_POST_DECLARE(MAXDOCS)];  /* Document array */
                                                                      /**
_PRE_DECLARE union doc *marker _POST_DECLARE();  /* Pointer to 1st re  ** Event handling data flags
cord in oldest day */                                                  **/
_PRE_DECLARE byte doc_array_full_flg _POST_DECLARE();                 _PRE_DECLARE byte DOOROPEN_PENDING _POST_DECLARE();
                                                                      _PRE_DECLARE byte DOORCLOSED _POST_DECLARE();
/* Accumulators */                                                    _PRE_DECLARE byte DO_LISTER_PENDING _POST_DECLARE();
_PRE_DECLARE unsigned long acc_nf_total _POST_DECLARE();  /* Non-Fee  _PRE_DECLARE byte OP_MODE _POST_DECLARE();
Value */                                                              _PRE_DECLARE byte SEQ_EVENT_PENDING _POST_DECLARE();
_PRE_DECLARE unsigned long acc_fee_total _POST_DECLARE(); /* Fee Document valu
e */                                                                  _PRE_DECLARE byte SEQ_INTERRUPT_PENDING _POST_DECLARE();
_PRE_DECLARE unsigned long acc_value_comm _POST_DECLARE(); /* Commission value  _PRE_DECLARE byte AUTODAILY_PENDING _POST_DECLARE();
 */                                                                   _PRE_DECLARE byte EXECMODE _POST_DECLARE();
_PRE_DECLARE unsigned long acc_value_fee _POST_DECLARE();  /* Fee Value */   _PRE_DECLARE byte RESET_ALIGN _POST_DECLARE();
_PRE_DECLARE unsigned int  acc_void_docs _POST_DECLARE();  /* Number voided */
_PRE_DECLARE unsigned int  acc_nf_docs _POST_DECLARE();    /* Number non-fee do  /* Document field values */
cuments dispensed */                                                  _PRE_DECLARE char txt_sn[_POST_DECLARE(46)];
_PRE_DECLARE unsigned int  acc_fee_docs _POST_DECLARE();   /* Number fee docume _PRE_DECLARE char txt_txt_in[_POST_DECLARE(97)];
nts dispensed */                                                      _PRE_DECLARE char txt_void_over[_POST_DECLARE(17)];
_PRE_DECLARE unsigned long acc_value_void _POST_DECLARE(); /* Voided Documents  _PRE_DECLARE char txt_courtesy_amt[_POST_DECLARE(9)];
 value */                                                             _PRE_DECLARE char txt_stub_amt[_POST_DECLARE(9)];
                                                                      _PRE_DECLARE char txt_stub_date[_POST_DECLARE(12)];
/* Report Totals */                                                   _PRE_DECLARE char txt_stub_fee[_POST_DECLARE(9)];
_PRE_DECLARE unsigned long nf_total _POST_DECLARE();    /* Non-Fee Document    _PRE_DECLARE char txt_stub_time[_POST_DECLARE(9)];
Value */                                                              _PRE_DECLARE char *txt_field[_POST_DECLARE(32)];    /* Text field ptr for doc p
_PRE_DECLARE unsigned long fee_total _POST_DECLARE();   /* Fee Document valu   rinting */
e */
_PRE_DECLARE unsigned long value_comm _POST_DECLARE();  /* Commission value    /* Function pointer arrays, used with menus */
 */                                                                   _PRE_DECLARE type_func func[_POST_DECLARE(MAXOPTS)]; /* The EXEC function table.
_PRE_DECLARE unsigned long value_fee _POST_DECLARE();   /* Fee Value */         */
_PRE_DECLARE unsigned int  void_docs _POST_DECLARE();   /* Number voided */
_PRE_DECLARE unsigned int  nf_docs _POST_DECLARE();     /* Number non-fee do   _PRE_DECLARE clock curr_date _POST_DECLARE();        /* Current date, day, time
cuments dispensed */                                                   */
_PRE_DECLARE unsigned int  fee_docs _POST_DECLARE();    /* Number fee docume   _PRE_DECLARE clock last_close _POST_DECLARE();       /* Last daily close date, d
nts dispensed */                                                      ay, time */
_PRE_DECLARE unsigned long value_void _POST_DECLARE();  /* Voided Documents    _PRE_DECLARE clock last_summry _POST_DECLARE();      /* Last summary report date
value */                                                              , day, time */
                                                                      _PRE_DECLARE clock rpt_date _POST_DECLARE();          /* report/close out date, d
/* PACK SERIAL NUMBER RANGES */                                       ay, time */
_PRE_DECLARE pack_range pack_tab[_POST_DECLARE(MAXPACKS)];             _PRE_DECLARE char first_num_de[_POST_DECLARE(3)];    /* First date included in c
_PRE_DECLARE byte curr_pack _POST_DECLARE();              /* Current pack inde  ummary rpt */
x */                                                                  _PRE_DECLARE char last_num_de[_POST_DECLARE(3)];     /* Last date included in su
_PRE_DECLARE byte next_pack _POST_DECLARE();              /* Second pack in ma  mmary rpt */
chine */
_PRE_DECLARE unsigned int pack_index _POST_DECLARE();     /* Current o         _PRE_DECLARE int delay_cnt _POST_DECLARE();          /* global delay count for d
ffset from start of pack */                                           elay */
_PRE_DECLARE byte load_pack_cnt _POST_DECLARE();          /* Number packs in m
achine */                                                             _PRE_DECLARE byte curr_op_id _POST_DECLARE();        /* Current operator ID */
_PRE_DECLARE union doc *next_doc _POST_DECLARE();         /* Next available do  _PRE_DECLARE byte SN_SIZE _POST_DECLARE();           /* Can be set based on spec
                                                                      ials */
                                                                      _PRE_DECLARE char curr_ser[_POST_DECLARE(MAX_SN_SIZE)]; /* Current serial no. (
```

```
04/07/1995  12:47          Filename: DATA.H                                Page 5              04/07/1995  12:47          Filename: DATA.H                                Page 6 next unissued) */                                                                                PRE_DECLARE long TIMER2 _POST_DECLARE();
PRE_DECLARE int    ser_val_hi _POST_DECLARE();    /* Serial number upper data
                                                                                                 PRE_DECLARE char   comm_passwd  [_POST_DECLARE(10)];
*/                                                                                               PRE_DECLARE byte   passwd_time _POST_DECLARE();
PRE_DECLARE long   ser_val_low _POST_DECLARE();   /* Serial number lower data                    PRE_DECLARE char   *lister_eol_data _POST_DECLARE();
*/                                                                                               PRE_DECLARE char   *lister_timeout_value _POST_DECLARE();
PRE_DECLARE byte   doc_cycle _POST_DECLARE();     /* Documents in current tra
ns_cycle */                                                                                      PRE_DECLARE byte   comm_rpt_fmt _POST_DECLARE();      /* Communications report form
                                                                                                 at */
/* Executive option values */                                                                    PRE_DECLARE byte   dial_method _POST_DECLARE();      /* Modem Dialing method */
PRE_DECLARE byte   op_passcd_req _POST_DECLARE(); /* Operator passcodes re                       PRE_DECLARE byte   modem_std _POST_DECLARE();        /* Modem transmission standar
quired? */                                                                                       d */
PRE_DECLARE byte   no_opc_close_out _POST_DECLARE()  /* close out for auto-da                    PRE_DECLARE byte   auto_ans _POST_DECLARE();         /* Enable auto-answer? */
ily w/no oper pc */                                                                              PRE_DECLARE int    auto_ans_beg _POST_DECLARE();     /* Auto-answer begin time */
PRE_DECLARE operators op_pc_tab[_POST_DECLARE(MAXOPERS)];  /* Operator Passcode                  PRE_DECLARE int    auto_ans_end _POST_DECLARE();     /* Auto-answer end time */
table */                                                                                         PRE_DECLARE byte   auto_dial _POST_DECLARE();        /* Enable auto-dial? */
                                                                                                 PRE_DECLARE int    auto_dial_beg _POST_DECLARE();    /* Auto-dial begin time */
PRE_DECLARE byte   void_on_jam _POST_DECLARE();   /* # of docs to void on jam */                 PRE_DECLARE int    auto_dial_end _POST_DECLARE();    /* Auto-dial end time */
                                                                                                 PRE_DECLARE byte   auto_ans_days[_POST_DECLARE(7)];  /* Auto-answer days */
PRE_DECLARE byte   print_adj_val _POST_DECLARE(); /* position of current print a                 PRE_DECLARE byte   auto_dial_days[_POST_DECLARE(7)]; /* Auto-dial days */
djustment */                                                                                     PRE_DECLARE char   pri_phone[_POST_DECLARE(21)];     /* Primary phone number */
PRE_DECLARE byte   autoload_value _POST_DECLARE();  /* position of current autoloa                PRE_DECLARE char   sec_phone[_POST_DECLARE(21)];     /* Secondary phone number */
d value */                                                                                       PRE_DECLARE char   man_phone[_POST_DECLARE(21)];     /* Manual Dial phone number
                                                                                                 */
PRE_DECLARE byte   op_time_out _POST_DECLARE();   /* Operator/Retract time-out *
/                                                                                                PRE_DECLARE range_fee fee_tab[_POST_DECLARE(SIZE_OF_FEE_TABLE)];  /* Fee Table
PRE_DECLARE byte   ex_time_out _POST_DECLARE();   /* Executive time-out */                       */
PRE_DECLARE byte   op_lock_out _POST_DECLARE();   /* Operator lock-out? */                       PRE_DECLARE unsigned long max_doc_val _POST_DECLARE();      /* Maximum document
PRE_DECLARE int    op_lock_out_beg _POST_DECLARE();  /* Lock-out begin time */                    value */
PRE_DECLARE int    op_lock_out_end _POST_DECLARE();  /* Lock-out end time */                     PRE_DECLARE unsigned long max_ven_pymt _POST_DECLARE();     /* Maximum vendor p
                                                                                                 ayment */
PRE_DECLARE byte   change_calc_req _POST_DECLARE();  /* option 25 - change calc  r                PRE_DECLARE byte   fee_table _POST_DECLARE();        /* Enable fees table? */
equired */                                                                                       PRE_DECLARE unsigned int commission _POST_DECLARE(); /* Commission */
PRE_DECLARE byte   key_reset_deply _POST_DECLARE();  /* Option 25 - require clear                PRE_DECLARE unsigned int pack_size _POST_DECLARE();  /* Pack size */
key to reset */                                                                                  PRE_DECLARE byte   pack_term _POST_DECLARE();        /* Pack termination action PRE_DECLARE char   machine_no[_POST_DECLARE(6)];     /* Machine ID parameters */                 PRE_DECLARE byte   doc_prt_fmt _POST_DECLARE();      /* Document print format */
PRE_DECLARE char   agent_no[_POST_DECLARE(8)];                                                   PRE_DECLARE byte   doc_length _POST_DECLARE();       /* Document length */
PRE_DECLARE char   chain_no[_POST_DECLARE(8)];                                                   PRE_DECLARE byte   doc_width _POST_DECLARE();        /* Document width */
PRE_DECLARE char   store_no[_POST_DECLARE(5)];                                                   PRE_DECLARE byte   doc_cnt_3_4 _POST_DECLARE();      /* current count of 3.4" doc
PRE_DECLARE char   do_digits[_POST_DECLARE(9)];                                                  uments */

PRE_DECLARE byte   ptr_err_pending _POST_DECLARE();  /* printer error used in tim                PRE_DECLARE byte   stub_fmt _POST_DECLARE();         /* Stub format */
ero ler */                                                                                       PRE_DECLARE byte   doc_format _POST_DECLARE();       /* check format */
PRE_DECLARE byte   rpt_device _POST_DECLARE();       /* Report device */                         PRE_DECLARE byte   check_dig _POST_DECLARE();        /* check digit */
PRE_DECLARE byte   rpt_cpi _POST_DECLARE();          /* Document printer char/inc                PRE_DECLARE byte   courtesy_amt _POST_DECLARE();     /* Print courtesy amount? */
h */
PRE_DECLARE byte   lstr_rpt_con _POST_DECLARE();     /* Lister report detailed/su                 PRE_DECLARE byte   void_over _POST_DECLARE();        /* Print "void over"? */
mmarized? */                                                                                     PRE_DECLARE byte   seq_verify _POST_DECLARE();       /* SN sequence verification?
PRE_DECLARE byte   lstr_rpt_lines _POST_DECLARE();   /* lister report one/two lin                 */
es? */                                                                                           PRE_DECLARE byte   seq_check_dig _POST_DECLARE();    /* SN sequence check digit
PRE_DECLARE byte   audit_trail _POST_DECLARE();      /* Print audit trail */                     */
PRE_DECLARE byte   op_dly_close _POST_DECLARE();     /* Operator daily to close f                 PRE_DECLARE byte   seq_num_tries _POST_DECLARE();    /* SN sequence number tries
iscal day? */                                                                                    */
PRE_DECLARE byte   op_smry_rpt _POST_DECLARE();                                                  PRE_DECLARE byte   seq_try_cnt _POST_DECLARE();      /* SN seq. no. of tries glob
PRE_DECLARE byte   day_already_closed _POST_DECLARE();                                           al count */
PRE_DECLARE byte   clr_acc_sumry _POST_DECLARE();    /* Clear accumulators after s                PRE_DECLARE byte   seq_door_open _POST_DECLARE();    /* SN sequence door open/clo
ummary? */                                                                                       sed flag */
PRE_DECLARE byte   auto_close _POST_DECLARE();       /* Auto-daily close-out? */                 PRE_DECLARE byte   seq_problem _POST_DECLARE();      /* SN sequence not resolved/
PRE_DECLARE byte   prt_auto_rpt _POST_DECLARE();     /* Print auto-daily report? *                problem flag */
/                                                                                                PRE_DECLARE byte   seq_feed_doc _POST_DECLARE();     /* SN sequence feed document
PRE_DECLARE byte   auto_rpt_copies _POST_DECLARE();  /* Number of lister copies to                 flag */
 print */
PRE_DECLARE int    auto_dly_time _POST_DECLARE();    /* Auto-daily time */                       PRE_DECLARE byte   pc_lockout _POST_DECLARE();       /* oper passcode lockout fl
PRE_DECLARE byte   auto_dly_days[_POST_DECLARE(7)];  /* Auto-daily days */                       ag */
                                                                                                 PRE_DECLARE byte   num_op_tries _POST_DECLARE();     /* # of tries allowed for op
                                                                                                 passcode */
```

STD 617 PA                                                         - 19 -

```
04/07/1995  12:47    Filename: DATA.H                                Page 7

PRE_DECLARE byte cur_auth_tries _POST_DECLARE();    /* current # of invalid op
passcode tries */
PRE_DECLARE byte void_auth _POST_DECLARE();          /* Operator void authority */

PRE_DECLARE byte pri_dial_count _POST_DECLARE();
PRE_DECLARE char *phone _POST_DECLARE();

PRE_DECLARE byte digit_pause _POST_DECLARE();        /* Inter-digit pause time */

PRE_DECLARE byte redial_time _POST_DECLARE();        /* Re-dial time */
PRE_DECLARE char user_id[_POST_DECLARE(4)];          /* User ID Number */

/* Hardware variables */
PRE_DECLARE int to_min_count _POST_DECLARE();
PRE_DECLARE int ptr_door_ct _POST_DECLARE();

PRE_DECLARE byte exec_time _POST_DECLARE();
PRE_DECLARE byte op_time _POST_DECLARE();
PRE_DECLARE byte comm_lock _POST_DECLARE();

/* Old MIDAMER stuff, now available for all */
PRE_DECLARE unsigned int max_poll _POST_DECLARE();
PRE_DECLARE unsigned int max_items _POST_DECLARE();
PRE_DECLARE int max_items_cnt _POST_DECLARE();
PRE_DECLARE unsigned long max_amount _POST_DECLARE();
PRE_DECLARE long max_amount_cnt _POST_DECLARE();
PRE_DECLARE byte mach_lock _POST_DECLARE();
PRE_DECLARE byte mach_suffix _POST_DECLARE();

/* I/O Task generic variables */
PRE_DECLARE byte curr_opt _POST_DECLARE();
PRE_DECLARE char io_tmp_str[_POST_DECLARE(21)];
PRE_DECLARE char print_line[_POST_DECLARE(23)];

PRE_DECLARE byte dbl_zero_flg _POST_DECLARE();

PRE_DECLARE byte low_flg[_POST_DECLARE(MAXOPTS)];    /* low level exec opt
  enable/disable table */
PRE_DECLARE byte opt1_flg[_POST_DECLARE(MAX_RPT_SZ)]; /* option 1 flags for
  low level exec */
PRE_DECLARE byte opt32_flg[_POST_DECLARE(2)];        /* option 32 flags fo
  r low level exec */

PRE_DECLARE type_tm_out tm_out[_POST_DECLARE(5)];    /* time out index */

PRE_DECLARE byte hi_exec_key_access _POST_DECLARE(); /* the high exec_ ke
  y enable flag */
PRE_DECLARE byte lo_exec_key_access _POST_DECLARE(); /* the low exec_key
  enable flag */
PRE_DECLARE byte exec_key_access _POST_DECLARE();    /* special [exec] ke
  ypad key enable flag */

PRE_DECLARE char *response _POST_DECLARE();          /* Used in comm and
  commfunc */
PRE_DECLARE char cmdbuf[_POST_DECLARE(SIZE_OF_CMDBUF)]; /* Used in comm and
  commfunc */
PRE_DECLARE char *cmdbufp _POST_DECLARE();           /* Used in comm and
  commfunc */
PRE_DECLARE byte *doc_datap _POST_DECLARE();         /* Used in doc array
  up/dnload */
PRE_DECLARE byte do_echo _POST_DECLARE();            /* Used in comm and
  commfunc */
PRE_DECLARE int msg_cnt _POST_DECLARE();             /* Used in comm and
  commfunc */
```

```
04/07/1995  12:47    Filename: DATA.H                                Page 8

PRE_DECLARE char tmp_comm_str[_POST_DECLARE(81)];    /* Used in comm and
  commfunc */

PRE_DECLARE KBD_BUF kbd_buf _POST_DECLARE();         /* Keyboard buf */
PRE_DECLARE UART_BUF uart_buf _POST_DECLARE();       /* Comm buf */
PRE_DECLARE char *uart_buf_tail _POST_DECLARE();     /* marker for end of comm buf
  */
PRE_DECLARE byte prev_pressed _POST_DECLARE(5)];     /* Used in interrupt */
PRE_DECLARE byte last_mins _POST_DECLARE();          /* Used in interrupt */

/* Clock stuff */
PRE_DECLARE byte blink_state _POST_DECLARE();
PRE_DECLARE byte blink_change _POST_DECLARE();
PRE_DECLARE int blink_cnt _POST_DECLARE();
PRE_DECLARE char *blink_str[] _POST_DECLARE(" ");
PRE_DECLARE long TIMER1 _POST_DECLARE();
PRE_DECLARE byte time_change _POST_DECLARE();

/* Lister / Printer config info */
PRE_DECLARE byte auto_lister_timeout_index _POST_DECLARE();
PRE_DECLARE char *doc_ptr_eol_data _POST_DECLARE() = "\x0D\x0A";

#define NUM_OF_LISTER_EOL          4
#define LISTER_EOL_CR              0
#define LISTER_EOL_LF              1
#define LISTER_EOL_CRLF            2
#define LISTER_EOL_USER_DEFINED    3
PRE_DECLARE byte lister_eol_choices[_POST_DECLARE(NUM_OF_LISTER_EOL)][SIZE_OF_L
ISTER_EOL_USER_DEFINED];

PRE_DECLARE long doc_amt _POST_DECLARE();
PRE_DECLARE int doc_cnt _POST_DECLARE();

/* character per inch indexes... */
#define CPI_10    0
#define CPI_12    1
#define CPI_17    2

/* This was in constdat with CODE_OR_RAM, but if MEMO, init tries
** to change some of the values, so it is RAM now */
PRE_DECLARE type_txt txt_fmt[]
#ifdef IN_MAIN
/** the fields are broken down into the following columns:
**
**      CPI   X    Y
**      INDEX AXIS AXIS
**      ----- ---- ----
*/
       /* The GENERIC format... */
       /* 0: NO_STUB */
       CPI_17,   0,  14,
       CPI_17,   0,  41,
       CPI_12,  45,  33,
       CPI_10,  47,   0, /* 8.5" ... */
       CPI_17,  25,  14,
       CPI_17,  25,  41,
       CPI_12,  61,  33,
       CPI_10,  61,   0,

/* 9.5" NO PRINT... */
```

STD 617 PA — 20 —

```
04/07/1995 12:4    Filename: DATA.H                                    Page 10
    CPI_12,  61,  22,
    CPI_10,  61,   0, /* 9.5" NO PRINT ..... */
    CPI_17,  42,  14,
    CPI_17,  42,  34,
    CPI_12,  73,  33,
    CPI_10,  71,   0, /* 9.5" SIDE BY SIDE  */
    CPI_17,  42,  14,
    CPI_17,   6,  34,
    CPI_17,  19,   0,
    CPI_17,  42,   0,
    CPI_12,  73,  33,
    CPI_10,  71,   0, /* 9.5" OVER UNDER    */
    CPI_17,   0,  14,
    CPI_17,  42,   0,
    CPI_17,   0,  34,
    CPI_17,  42,   0,
    CPI_12,  73,  33,
    CPI_10,  71,   0, /* 9.5" SPECIAL FORMAT */
    CPI_17,   9,  14,
    CPI_17,  28,   0,
    CPI_17,  42,  41,
    CPI_17,  42,   0,
    CPI_17,   7,  41,
    CPI_17,  27,   0,
    CPI_12,  73,  33,
    CPI_10,  71,   0,
#endif
};
_PRE_DECLARE SCREEN_STRUCT screen _POST_DECLARE();

/**
*** DO NOT ADD DATA BEYOND THIS POINT !!!!!!
***
**/
_PRE_DECLARE int check_sum _POST_DECLARE();   /* Memory check sum */

/* Clean-up */
#undef _PRE_DECLARE
undef _POST_DECLARE endif
/****************** END OF DATA *******************************/
```

```
04/07/1995 12:47    Filename: DATA.H                                   Page 9
    CPI_17,  42,  14,
    CPI_17,  42,  41,
    CPI_12,  73,  33,
    CPI_10,  71,   0, /* 9.5" SIDE BY SIDE  */
    CPI_17,  41,  14,
    CPI_17,   6,  41,
    CPI_17,  19,   0,
    CPI_17,  41,   0,
    CPI_12,  73,  33,
    CPI_10,  71,   0, /* 9.5" OVER UNDER    */
    CPI_17,   0,  14,
    CPI_17,  41,   0,
    CPI_17,   0,  41,
    CPI_17,  41,   0,
    CPI_12,  73,  33,
    CPI_10,  71,   0,
/*       The AMEX format ...... */
    /* 7" NO STUB ...... */
    CPI_17,   0,  49,
    CPI_17,   0,  41,
    CPI_12,  45,  33,
    CPI_10,  47,   0, /*    8.5" ......    */
    CPI_17,  24,  49,
    CPI_17,  24,  41,
    CPI_12,  61,  33,
    CPI_10,  61,   0, /* 9.5" NO PRINT ..... */
    CPI_17,  41,  49,
    CPI_17,  41,  41,
    CPI_12,  73,  33,
    CPI_10,  71,   0, /* 9.5" SIDE BY SIDE  */
    CPI_17,  24,  49,
    CPI_17,   6,  41,
    CPI_17,  19,   0,
    CPI_17,  41,   0,
    CPI_12,  73,  33,
    CPI_10,  71,   0, /* 9.5" OVER UNDER    */
    CPI_17,   0,  45,
    CPI_17,  41,   0,
    CPI_17,   0,  41,
    CPI_17,  41,   0,
    CPI_12,  73,  33,
    CPI_10,  71,   0,
/*       The TRAVELERS format ..... */
    /* 7" NO STUB ...... */
    CPI_17,   0,  14,
    CPI_17,   0,  34,
    CPI_12,  45,  33,
    CPI_10,  47,   0,

/*    8.5" ......    */
    CPI_17,  25,  14,
    CPI_17,  25,  34,
```

STD 617 PA                                           - 21 -

```
06/10/1995 13:39    Filename: ISP.C                               Page 1
/****************************************************************
* isr.c - Interrupt Service Routines
*
****************************************************************/ include "8032.h"
include "io.h"
#include "data.h"
#include "proto.h"

/****************************************************************
** void read_rtc()
**
** Reads rtc time, date and day. Updates 'curr_date'. This function is only
** called by init() and the 20 ms isr.
****************************************************************/
void read_rtc(void)
{
    byte mask_hrs;

/* HRS is from 1 <-> 12 with pm id'ed as 0x8? */
    mask_hrs = HRS & 0x7F;
    if ( (mask_hrs > 0) && (mask_hrs < 13) && (MINS < 60) )
    {
        if (mask_hrs == 12)
            mask_hrs = 0;

if (HRS & 0x80)
            mask_hrs += 12;

/* clk_time is number of minutes since midnight */
        curr_date.clk_time = ((int)(mask_hrs * 60)) + (int)MINS;
    }
    else
        curr_date.clk_time = 0;  /* set time to 0 if not currently valid */
```

```
06/10/1995 13:39    Filename: ISP.C                               Page 2
    /* set 1st byte of the date string to NULL to assume an invalid date */
    curr_date.clk_date[0] = (byte)0;
    if ( (MONTH && (MONTH < 13)
        && (DOM && (DOM < 32))
        && (YEAR < 100)
        && (DOW && (DOW < 8)) )
    {
        curr_date.clk_date[0] = MONTH;
        curr_date.clk_date[1] = DOM;
        curr_date.clk_date[2] = YEAR;
        curr_date.dow = DOW - 1;
    }
}

/****************************************************************
**
**    NAME     :    set_rpt_date
**
****************************************************************/
void set_rpt_date(void)
{
    /* Don't use strcpy() because this can be called by timer0 and strcpy
    ** is not reentrant.
    **      strncpy(rpt_date.clk_date, curr_date.clk_date, 3);
    */
    rpt_date.clk_date[0] = curr_date.clk_date[0];
    rpt_date.clk_date[1] = curr_date.clk_date[1];
    rpt_date.clk_date[2] = curr_date.clk_date[2];
    rpt_date.dow = curr_date.dow;
    rpt_date.clk_time = curr_date.clk_time;
}

/****************************************************************
** void timer0_isr()
**
** Timer 0 interrupt service routine. This is the 20 ms system timer.
****************************************************************/
void timer0_isr(void) interrupt 1
{
    int    cnt_min_cnt;
    byte   tmp_byte;

TR0 = FALSE;               /* disable timer */ scan_kbd();

if (delay_cnt)
        --delay_cnt;

/* LEAVE THIS TEST AT > 0. This way timer will never set to zero and
    ** some other logic keys off of negative TIMER. */
    if (TIMER1 > 0)
        --TIMER1;

/* LEAVE THIS TEST AT > 0. This way timer will never set to zero and
    ** some other logic keys off of negative TIMER. */
    if (TIMER2 > 0)
        --TIMER2;

if (--blink_cnt == 0)
    {
        blink_change = TRUE;
        blink_cnt = 50;
```

STD 617 PA                                           - 22 -

```
06/10/1995 13:39    Filename: ISR.C                              Page 3

/* Added as part of startup from garbage RAM case.  Basically until the
** global vars can get inited, do not try to use them for other
** logic.  This was screwing-up on 'very first' power-up cases. */
if (NEWPROM)
{
    TH0 = TIMBRO_HI;
    TL0 = TIMBRO_LO;       /* 20 ms timer value */
    TR0 = TRUE;            /* enable timer */
    return;
}

/* check the door switch */
if (DOORSW)                /* door closed? */
{
    /*
    ** DOOROPEN is used to determine if a door state change
    ** has occurred.  Once the door is opened, post a flag to print
    ** "door open" message.  Once the door is closed (after being opened),
    ** post a flag for serial number sequencing if valid.
    */
    if (DOOROPEN_PENDING)
    {
        DOORCLOSED = TRUE;
    }
}
else
{
    /*
    ** THE DOOR IS OPEN...
    */
    DOOROPEN_PENDING = TRUE;
}

/*
** Hi Exec processing...
*/
if (HI_EXECENTRY)
{
    /* REMEMBER: exec keys are active low! */
    if (HI_EXEC_KEY)
    {
        HI_EXECENTRY = FALSE;
        if ((EXECMODE == 2) && (HI_EXEC_BUTTON))
            EXIT_EXEC = TRUE;
    }
}
else
{
    /* REMEMBER: exec keys are active low! */
    if ( ((HI_EXEC_KEY) && (hi_exec_key_access == ENABLED))
       ||
         HI_EXEC_BUTTON )
    {
        HI_EXECENTRY = TRUE;
    }
}

/*
** Low Exec processing...
*/
```

```
06/10/1995 13:39    Filename: ISR.C                              Page 4 if (LOW_EXECENTRY)
{
    /* REMEMBER: exec keys are active low! */
    if (LOW_EXEC_KEY)
    {
        LOW_EXECENTRY = FALSE;
        if (EXECMODE == 1)
            EXIT_EXEC = TRUE;
    }
}
else
{
    /* REMEMBER: exec keys are active low! */
    if ((LOW_EXEC_KEY) && (lo_exec_key_access == ENABLED))
    {
        LOW_EXECENTRY = TRUE;
    }
}

/* Has a minute elapsed? */
if (last_mins != MINS)
{
    last_mins = MINS;
    time_change = TRUE;

/* update the current minute count */
    read_rtc();
    cmt_min_cnt = curr_date.clk_time;

if (auto_ans)
    {
        /* If 'round the clock' */
        if (auto_ans_beg == auto_ans_end)
        {
            if (auto_ans_days[curr_date.dow])
                AUTOAN = TRUE;
            else
                AUTOAN = FALSE;
        }
        else
        {
            if (auto_ans_beg < auto_ans_end)
            {
                if (cmt_min_cnt >= auto_ans_beg &&
                    cmt_min_cnt < auto_ans_end)
                {
                    if (auto_ans_days[curr_date.dow])
                        AUTOAN = TRUE;
                    else
                        AUTOAN = FALSE;
                }
                else
                    AUTOAN = FALSE;
            }
            else  /* Must be a roll-over midnight case */
            {
                if ((cmt_min_cnt >= auto_ans_end &&
                     cmt_min_cnt < auto_ans_beg))
                {
                    /* Set yesterday */
                    if (curr_date.dow == DOW_SUNDAY)
                        tmp_byte = DOW_SATURDAY;
                    else
```

STD 617 PA                                                           - 23 -

```
tmp_byte = curr_date.dow - 1;

/* Set yesterday */
if (curr_date.dow == DOW_SUNDAY)
    tmp_byte = DOW_SATURDAY;
else
    tmp_byte = curr_date.dow - 1;

/* If we are allowed to set it for current date OR if
** we are on the other side of midnight of window and were
** allowed yesterday, then finish-out the window. */
if (auto_dial_days[curr_date.dow] ||
    (crnt_min_cnt < auto_dial_end && auto_dial_days[tmp_byte]))
{
    AUTODIAL = CONNECT_PENDING = TRUE;
}
else  /* Outside setup window(s) */
{
    if (AUTODIAL)
        AUTODIAL = CONNECT_PENDING = FALSE;
}
}
else /* If outside window, clear out dial done for next time */
{
    AUTODIAL_DONE = FALSE;
} if (AUTODIAL)
    AUTODIAL = CONNECT_PENDING = FALSE;

/* To prevent stacking lock on top of lock - don't even look for
** operator lock if other lock is already activated. */
if (!mach_lock && !comm_lock)
{
    if (op_lock_out)
    {
        LOCKOUT = FALSE;
        /* If 'round-the-clock' */
        if (op_lock_out_beg == op_lock_out_end)
            LOCKOUT = TRUE;
        else
        if (op_lock_out_beg < op_lock_out_end)
        {
            if (crnt_min_cnt >= op_lock_out_beg &&
                crnt_min_cnt < op_lock_out_end)
                LOCKOUT = TRUE;
        }
        else /* Must be a roll-over midnight case */
        {
            if (!(crnt_min_cnt >= op_lock_out_end &&
                  crnt_min_cnt < op_lock_out_beg))
                LOCKOUT = TRUE;
        }
    }
}
```

```
tmp_byte = curr_date.dow - 1;

/* If we are allowed to set it for current date OR if
** we are on the other side of midnight of window and were
** allowed yesterday, then finish-out the window. */
if (auto_ans_days[curr_date.dow] ||
    (crnt_min_cnt < auto_ans_end && auto_ans_days[tmp_byte]))
    AUTOAN = TRUE;
else
    AUTOAN = FALSE;
}
else
    AUTOAN = FALSE;

if (auto_dial)
{
    /* If 'round-the-clock' */
    if (auto_dial_beg == auto_dial_end)
    {
        AUTODIAL = CONNECT_PENDING = TRUE;
        AUTODIAL_DONE = FALSE; /* This would constantly dial ??? */
    }
    else /* Outside setup window(s) */
    {
        if (AUTODIAL)
            AUTODIAL = CONNECT_PENDING = FALSE;
    }
    else
    if (auto_dial_beg < auto_dial_end)
    {
        if (crnt_min_cnt >= auto_dial_beg &&
            crnt_min_cnt < auto_dial_end)
        {
            if (auto_dial_days[curr_date.dow])
                AUTODIAL = CONNECT_PENDING = TRUE;
            else /* Outside setup window(s) */
            {
                if (AUTODIAL)
                    AUTODIAL = CONNECT_PENDING = FALSE;
            }
        }
        else /* If outside window, clear out dial done for next time */
        {
            AUTODIAL_DONE = FALSE;
        }
    }
    else /* Must be a roll-over midnight case */
    {
        if (!(crnt_min_cnt >= auto_dial_end &&
              crnt_min_cnt < auto_dial_beg))
        {
```

STD 617 PA                                                           - 24 -

```
06/10/1995 13:39     Filename: ISR.C                                Page 7

/* Operator timeout ONLY */
       if (KEYPRESS)
       {
           KEYPRESS = FALSE;
           TIMEOUT = FALSE;
           op_time = op_time_out;
           exec_time = ex_time_out;
       }
       else
       {
           if ((!HI_EXEC_BUTTON && !EXEC_BUTTON && !LOW_EXECENTRY && !HI_EXECENTR
Y && !CONNECT)
           {
               if (op_time_out && (--op_time == (byte)0))
                   TIMEOUT = TRUE;
           }
           if (EXEC_BUTTON || HI_EXEC_BUTTON)
           {
               if (ex_time_out && (--exec_time == (byte)0))
                   TIMEOUT = TRUE;
           }
       }
       /* End of if not machine or comm lock */

/* We'll process close-outs if in machine lock but NOT if in
       ** a comm lock. */
       if (!comm_lock)
       {
           if (auto_close)
           {
               if (auto_dly_days(curr_date.dow) && (cint_min_cnt == auto_dly_time))
               {
                   set_rpt_date();
                   AUTODAILY = TRUE;
               }
           }
       } /* End of if not comm lock */

} /* end of: (last_min != MIN) */

THO = TIMER0_HI;              /* 20 ms timer value */
   TL0 = TIMER0_LO;
   TR0 = TRUE;                   /* enable timer */
}

/*********************************************************
* void printer_isr()
*
* Parallel printer acknowledge (external interrupt 1) interrupt service
* routine.
**********************************************************/
void printer_isr(void) interrupt 2
{
   PTRDY = TRUE;
}

/*********************************************************
* void timer1_isr()
*
* Timer 1 interrupt service routine. This isr is not used, since T1 is the
```

```
06/10/1995 13:39     Filename: ISR.C                                Page 8

* auto-reloading baud rate generator for the UART.
**********************************************************/
void timer1_isr(void) interrupt 3
{
}

/*********************************************************
* void uart_isr()
*
* On-chip UART serial transmit interrupt service routine.
**********************************************************/
void uart_isr(void) interrupt 4
{
   if (TI)
   {
       TI = FALSE;
       TXRDY = TRUE;
   }
   if (RI)
   {
       RI = FALSE;
       /*
       ** If we are allowed to do comm - then set flag to tell main loop
       ** that a char has come in.
       */
       if ((line)SBUF == (int)(RING_STATUS + '0') &&
           (RS232COMM || MANUALAN || AUTOAN))
       {
           CONNECT_PENDING = TRUE;
       }
       uart_put_char(SBUF);
   }
}

/*********************************************************
* void timer2_isr()
*
* Timer 2 interrupt service routine. This timer is used as a multiple of
* 50 ms.
**********************************************************/
void timer2_isr(void) interrupt 5
{
}

/*********************************************************
* void scan_kbd()
*
* Scan the keyboard columns for a key depression, ignoring all other keys
* until release.
**********************************************************/
void scan_kbd()
{
   byte key;

if ( (key = (KB_COL_0 & 0x1F)) != 0x1F)
       check_kbd_state(key, 0);
   else
```

STD 617 PA — 25 —

```
    prev_pressed[0] = FALSE;

if ( (key = (KB_COL_1 & 0x1F)) != 0x1F)
    check_kbd_state ((key |= 0x20), 1);
else
    prev_pressed[1] = FALSE;

if ( (key = (KB_COL_2 & 0x1F)) != 0x1F)
    check_kbd_state ((key |= 0x40), 2);
else
    prev_pressed[2] = FALSE;

if ( (key = (KB_COL_3 & 0x1F)) != 0x1F)
    check_kbd_state ((key |= 0x60), 3);
else
    prev_pressed[3] = FALSE;

if ( (key = (KB_COL_4 & 0x1F)) != 0x1F)
    check_kbd_state ((key |= 0x80), 4);
else
    prev_pressed[4] = FALSE;
}

/*********************************************************************/ void check_kbd_state (byte key, byte column)
{
if (prev_pressed[column] == FALSE)
{
    put_kbd_char (key);
    prev_pressed[column] = TRUE;
}
}

/*********************************************************************
 * void uart_put_char(char)
 *
 * Called by the uart interrupt routine to put a
 * character into uart buffer if it is not full, otherwise
 * character is dumped.
 *********************************************************************/
void uart_put_char(char c)
{
if ( !COMMOUTFUL )
{
    *uart_buf.outp++ = c;
    COMMOUTEMP = FALSE;

/* Check for wrap-around on ring buffer */ if (uart_buf.outp == uart_buf_tail)
        uart_buf.outp = uart_buf_buffer;

if (uart_buf.inp == uart_buf.outp)
        COMMOUTFUL = TRUE;
}
else
{
    /* Since comm was already FULL and tried to put another char
    ** set Overrun flag. */

COMMOUTOVR = TRUE;
}
}
```

/************** END OF ISR.C **************/

STD 617 PA                                                                  - 26 -

```
04/18/1995 11:50    Filename: MAIN.C                                    Page 3 define IN_MAIN 1
include "data.h"

#include "8032.h"
#include "ic.h"
#include "constdat.h"
#include "struct.h"
#include "proto.h"

#include <absacc.h>
#include <stdio.h>
#include <string.h>
include <stdlib.h> void main(void)
{
    byte key, key2, op_entry;
    char d_str[21];
    char tmp_str[3];
    byte exec_was;    /* Hold last exec so we can post exiting messages */
    byte hi_exit;

GA = FALSE;       /* disable all interrupts */
    /* For serial number seq */
    seq_problem = NO;

/* Set time prompt before init, because it can print lister which may
    ** timeout */
    TIME_PROMPT = FALSE;
    time_change = TRUE;
    op_entry = FALSE;
    EXEC_BUTTON = HI_EXEC_BUTTON = EXIT_EXEC = FALSE;   /* reset exit flag on
/* in main loop. */
    init();

for (;;)
    {
        /* If we are trying to come BACK into flash, then do it. */
        if (CONNECT_PENDING ||
            do_flag_control(&FLASH_CONTROL, FLASH_CONTROL_TO_FLASH, NULL_STR, FALSE)
== ON)
        {
            TIME_PROMPT = FALSE;
            CONNECT = TRUE;
```

```
04/18/1995 11:50    Filename: MAIN.C                                    Page 4

CONNECT_PENDING = FALSE;

/* If we are trying to come BACK into flash, then don't reinit */
            if (do_flag_control(&FLASH_CONTROL, FLASH_CONTROL_TO_FLASH, NULL_STR, FA
LSE) == ON)
            {
                /* Turn it off */
                do_flag_control(&FLASH_CONTROL, FLASH_CONTROL_TO_FLASH, OFF_ON[OFF]
, FALSE);
                COMMACTIVE = TRUE;
                if (UARTMOD == RS232)
                {
                    RS232COMM = TRUE;
                }
                else
                {
                    RS232COMM = FALSE;
                }
                comm_task(comm_mode, baud_rate_index, OPTION);
            }
            else /* Just plain old boring comm request ... ho hum ... */
            {
                comm_task(comm_mode, baud_rate_index, MAKE_CONNECTION);
            }
            CONNECT = FALSE;
            TIME_PROMPT = TRUE;
        }

/* Special RECONNECT logic.
        ** If a dradoc or dmalldoc is not completed successfully
        ** a reconnect will happen and keep happening until
        ** it does! */
        while (do_flag_control(&FLASH_CONTROL, FLASH_CONTROL_AUTO_RECONNECT_FLASH,
NULL_STR, FALSE) == ON)
        {
            TIME_PROMPT = FALSE;
            CONNECT = TRUE;
            CONNECT_PENDING = FALSE;

comm_task(comm_mode, baud_rate_index, AUTO_RECONNECT);
        } while (mach_lock)
        {
            TIMEOUT = FALSE;
            clr_dsply00(MACHINE_LOCK_STR);
            cprintf(d_str, "%c", mach_suffix);
            dsply_str0(23, d_str);
            dsply_str10(CALL_MONEY_ORDER_00);
            key = get_key();
            if ((key == PHONE) || (CONNECT_PENDING))
            {
                TIME_PROMPT = FALSE;
                CONNECT = TRUE;
                CONNECT_PENDING = FALSE;
            }
            if (key == PHONE)
                op_comm();
            else
                comm_task(comm_mode, baud_rate_index, MAKE_CONNECTION);
```

```
                         STD 617 PA                              - 27 -

04/18/1995  11:50    Filename: MAIN.C                                  Page 5

CONNECT = FALSE;
        TIME_PROMPT = TRUE;
    } while (comm_lock)
    {
        TIME_PROMPT = FALSE;
        clr_dsply00 (COMMUNICATIONS_LOCK);
        key = get_key();
        if ((key == PHONE) || CONNECT_PENDING)
        {
            TIME_PROMPT = FALSE;
            CONNECT = TRUE;
            CONNECT_PENDING = FALSE;

if (key == PHONE)
                op_comm();
            else
                comm_task(comm_mode, baud_rate_index, MAKE_CONNECTION);

CONNECT = FALSE;
            TIME_PROMPT = TRUE;
        }
    } if (!HI_EXEC_KEY && (hi_exec_key_access == DISABLED) && !CONNECT)
    {
        TIME_PROMPT = FALSE;
        clr_dsply00 (EXECUTIVE_KEY_SWITCH);
        dsply_str10 (NOT_AVAILABLE);

/* wait on key switch to be returned to original position */
        while (!(!HI_EXEC_KEY && !CONNECT));

TIME_PROMPT = TRUE;
    } if (!LOW_EXEC_KEY && (lo_exec_key_access == DISABLED) && !CONNECT)
    {
        TIME_PROMPT = FALSE;
        clr_dsply00 (EXECUTIVE_KEY_SWITCH);
        dsply_str10 (NOT_AVAILABLE);

/* wait on key switch to be returned to original position */
        while (!(!LOW_EXEC_KEY && !CONNECT));

TIME_PROMPT = TRUE;
    } if (((HI_EXECENTRY || LOW_EXECENTRY) || EXEC_BUTTON || HI_EXEC_BUTTON)
         && !CONNECT_PENDING)
    {
        /* Must setup exec_was before trying to print audit message. */
        if (HI_EXECENTRY || HI_EXEC_BUTTON)
            exec_was = HIGH_SWITCH;
        else
        if (LOW_EXECENTRY || EXEC_BUTTON)
            exec_was = LOW_SWITCH;

TIME_PROMPT = TIMEOUT = FALSE;

exec_entry_audit(ENTERING_EXEC, exec_was);

if (HI_EXECENTRY || HI_EXEC_BUTTON)
```

```
04/18/1995  11:50    Filename: MAIN.C                                  Page 6

{
            EXECMODE = HIGH;
            /* reset key button access if high or both */
            if (exec_key_access > 1)
                exec_key_access = 0;
        }
        else
        if (LOW_EXECENTRY || EXEC_BUTTON)
        {
            EXECMODE = LOW;
            /* reset key button access if low only */
            if (exec_key_access == 1)
                exec_key_access = 0;
        }

/* Recheck, if turn key back off while in listen timeout then
        ** ENTRY's might not still be set. */
        if (EXECMODE != 0)
        {
            if (HI_EXEC_BUTTON)
            {
                hi_exit = TRUE;
            }
            else
                hi_exit = FALSE;

check_exec();
        } if (EXECMODE == HIGH)
        {
            /**
            ** If the high exec key was NOT enabled in the
            ** last high exec mode, then if Mid America, disable...
            **/
            if (!HI_KEY_SET)
            {
                if (is_SPECIAL_FUNCTION(MIDAMER))
                    hi_exec_key_access = DISABLED;
            }
        } if (hi_exit)
            HI_EXEC_BUTTON = FALSE;

EXEC_BUTTON = EXIT_EXEC = FALSE;       /* reset exit flag only in main */
        EXECMODE = 0;

exec_entry_audit(EXITING_EXEC, exec_was);

oop...  time_change = TRUE;
        /* Assume init prompt.    */
        disable_cur();

if ((SEQ_EVENT_PENDING || SEQ_INTERRUPT_PENDING || RESET_ALIGN) && !CONNECT
_PENDING)
        {
            TIME_PROMPT = FALSE;
            SEQ_EVENT_PENDING = FALSE;
            interact_doc ();
            RESET_ALIGN = TRUE;
        } if (seq_verify)
        {
```

STD 617 PA                                                                -28-

```
04/18/1995 11:50      Filename: MAIN.C                           Page 7 if (!SEQ_INTERRUPT_PENDING)
    press_clear (ALIGN_DOC_TO_TEARBAR);
if (!RESET_ALIGN)
{
    SEQMENU = TRUE;    /* let ent_setno know to use SN seq. check digit
    seq_get_sn();
    auto_void_last_3 ();
    SEQMENU = FALSE;
    RESET_ALIGN = FALSE;
    if ((CONNECT_PENDING && !HI_EXECENTRY && LOW_EXECENTRY == 0))
    {
        SEQ_INTERRUPT_PENDING = FALSE;
    }
    time_change = TRUE;
}
else
{
    SEQ_EVENT_PENDING = FALSE;
    press_clear (ALIGN_DOC_TO_TEARBAR);
} if (pc_lockout || LOCKOUT)
{
    TIME_PROMPT = FALSE;
}
/* if passcode lock out then wait for event else lockout period */
if (pc_lockout)
while ((HI_EXECENTRY == 0 && LOW_EXECENTRY == 0 && !EXEC_BUTTON &&
       !HI_EXEC_BUTTON && !CONNECT_PENDING && !SEQ_EVENT_PENDING)
{
    clr_dsply00(OPERATOR_LOCK);
    key = get_key();
    /**
     **  A new Mid-America Special feature:
     **  Enable the Phone Key during an Operator Lock.
     **/
    if ((key == PHONE) || CONNECT_PENDING)
    {
        CONNECT = TRUE;
        CONNECT_PENDING = FALSE;
        if (key == PHONE)
            op_comm();
        else
            comm_task(comm_mode, baud_rate_index, MAKE_CONNECTION);
        CONNECT = FALSE;
    }
    /* if the (exec) key has been pressed and the low exec button fla */
    if ((key == EXEC) && (exec_key_access & 1))
        EXEC_BUTTON = TRUE;
}
else
{
```

```
04/18/1995 11:50      Filename: MAIN.C                           Page 8 while (!HI_EXECENTRY == 0 && LOW_EXECENTRY == 0 && !EXEC_BUTTON
           && !CONNECT_PENDING && !SEQ_EVENT_PENDING && LOCKOUT)
    {
        clr_dsply00(OPERATOR_LOCK);
        /* if the (exec) key has been pressed and the low exec button fla
g enabled... */
        if ((get_key() == EXEC) && (exec_key_access & 1))
            EXEC_BUTTON = TRUE;
    }
    TIME_PROMPT = TRUE;
    TIMEOUT = FALSE;
}
if ((HI_EXECENTRY == 0 && LOW_EXECENTRY == 0) && !HI_EXEC_BUTTON
    && !CONNECT_PENDING)
{
    INIT_PROMPT = TRUE;
    key = 0;
    if (op_passed_req)
        key = ent_op_passed ();          /* go to op. ps prompt (w/TIMEOUT) */
    else
    {
        curr_op_id = 99;
        INIT_PROMPT = FALSE;
    }
} if ( (key == ENTER) || (!op_passed_req && !EXEC_BUTTON && !HI_EXEC_BUTTON))
{
    if (op_passed_req)
        op_entry = TRUE;
    else
        INIT_PROMPT = TRUE;         /* set and check for timeout */
    op_time = op_time_out;           /* reset for timeout */
    key = op_proc ();
    OP_MODE = TRUE;
    INIT_PROMPT = FALSE;
}
if (key == SERVICE)
{
    key = TIME_PROMPT;    /* Save old value */
    TIME_PROMPT = FALSE;
    opt_29();
    TIME_PROMPT = key;    /* Restore prev value */
} if (TIMEOUT)
{
    TIMEOUT = FALSE;
    op_time = op_time_out;
    if (op_entry)
    {
        op_entry = FALSE;
        do
        {
            TIMEOUT = FALSE;
            press_clear(Operator_Time_Out);
```

STD 617 PA

```
        while (TIMEOUT);
    };
    op_entry = FALSE;
    TIMEOUT = FALSE;
    time_change = TRUE;
    auto_void_last_3();
}; /* End of for ;; */
}
/*************** END OF MAIN.C ***************/
```

```
06/16/1995 14:31          Filename: COMMFUNC.C                                    Page 2 include "version.h"

include <ctype.h>
#include <stdio.h>
#include <string.h>
include <stdlib.h>

/**********************************************************************
 *
 * upload_dnload_cmd
 *
 **********************************************************************/
void upload_dnload_cmd(int type)
{
   int i, j, len = 0;
   unsigned int tmp_uint;
   byte loc_byte, loc_byte2;
   int option_len;
   int db_start_add, db_end_add;        /* debug dump addresses */
   int option, save_option, *optionp, *len_p;
   char suffix, save_suffix;

CKSUMERR = TRUE;   /* Assume the worst until we prove everything is OK */

/* Move past either 'UPLOAD' or 'DNLOAD'.  point to option */
   cmdbufp = cmdbuf + 6;

tmp_comm_str[0] = *cmdbufp;
   tmp_comm_str[1] = *(cmdbufp + 1);
   tmp_comm_str[2] = '\0';

option = save_option = atoi(tmp_comm_str);

option += 0x8000;  /* to distinguish exec options from lengths */
   response = cmdbufp + 2;           /* point to suffix */ suffix = save_suffix = *response++;    /* point to parameter(s) */ if (type == COMM_UPLOAD)
   {
      /* For upload, cksum is done on OPTION + SUFFIX */
      response = cmdbufp;
   }

/* To start w/ suffix must be an ALPHA */
   if (isalpha((int)suffix))
   {
      len = cmp_cksum();   /* Also sets len */
   }

/* Don't even bother w/ length comparison if an error has occured. */
   if (!CKSUMERR)
   {
      /* Turn the flag back on - if len and suffix fails, this will still be true
         CKSUMERR = TRUE;  Assume the worst until we prove everything is OK */ optionp = option_tbl;             /* options and their lengths */
      while (*optionp != 0xFFFF)
      {
         if (*optionp == option)        /* option found */
         {
            /* Lookup suffix by doing offset from option based on
            ** letter of suffix. There is a sequence of dnload_suffix
            ** upload_suffix. So there are 2 for every suffix_
```

```
#include "8032.h"
#include "const.h"
include "constdat.h"
#include "struct.h"
#include "data.h"
#include "proto.h"
```

STD 617 PA                                                          - 31 -

```
06/16/1995 14:31        Filename: COMMFUNC.C                         Page 2 response = cmdbuf;
            sprintf(response, "%dlc", save_option, save_suffix);
            response += 3;
        }
        /* Based on found option - do assignments */ switch (option)
        {
        case OP_PASSCODE:
            switch (suffix)
            {
            case 'A':  /* Single Operator Passcode */

/* Point to Op ID */
                if (type == COMM_UPLOAD)
                    response = cmdbuf + 9;
                else
                    response = cmdbuf + 10;

/* IMPORTANT
                ** SPECIAL - regardless of type, must pull out Op ID from
                ** incoming string.  Here loc_byte is actually Oper ID and
                ** we want to pull out so always use DNLOAD */
                do_2byte_assignment(&loc_byte, COMM_DNLOAD);

/* Validate valid Op ID */
                if ((int)loc_byte <= 0 || (int)loc_byte > MAXOPERS)
                {
                    CKSUMERR = TRUE;
                    break;
                }

/* Prepare to load data into buf */
                if (type == COMM_UPLOAD)
                    response = cmdbuf + 3;
                else
                    response = cmdbuf + 9;

/* Now, do other info */

/* Either one or all Op passcodes start w/ flag
                ** for Are Passcodes Required */
                do_byte_assignment(&op_passcd_req, type);

do_2byte_assignment(&loc_byte, type);   /* Here loc_byte is actually Oper ID */ loc_byte--;   /* Ajust to array offsets (i.e. 0, 1, ... vs 1, 2, ...) */ do_str_assignment(op_pc_tab[loc_byte].passcode, SIZE_OF_OPERS, type);

/* If it's a download - clear flag */
                if (type == COMM_DNLOAD)
                    op_pc_tab[loc_byte].flag = 0;

break;

case 'B':  /* All Operator Passcodes */

/* Either one or all op passcodes start w/ flag
                ** for Are Passcodes Required. */
```

```
06/16/1995 14:31        Filename: COMMFUNC.C                         Page 1

** So if we multiply by 2 we will be at UPLOAD. If it is
            ** a DNLOAD then subtract 1. */
            option_len = (int)(suffix - 'A');
            option_len *= 2;
            if (type == COMM_DNLOAD)
                option_len--;

/* Well, option_len should be the offset from optionp based
            ** on a valid suffix.  Let's check the suffix.  Basically,
            ** shouldn't find another Exec flag (0x8000) before option_len. */ for (i = option_len; i > 0; i--)
            {
                if (((*(optionp + i)) & 0x8000) != 0)
                    break;
            }

/* If we've counted all the way down, then OK, otherwise
            ** we found another exec option number. */
            if (i == 0)
            {
                len_p = (optionp + option_len);
                option_len += *len_p;
                /* Do lengths match ? */
                if (option_len == len)
                    CKSUMERR = FALSE;
            }

/* NOTE: IMPORTANT !!!
            ** We are "done" with option_len as used to make sure response
            ** coming in is the length we expected.  For the rest of the
            ** software, option_len is used to tell how long a particular
            ** option is, so if we are doing uploading, then load-up
            ** download length which is the length of the data.  Otherwise
            ** option_len is just the length of upload command (not what we
            ** want). */
            if (type == COMM_UPLOAD)
                option_len = *(--len_p);

/* Regardless of other errors, we found the option number
            ** we were looking for, so get out of loop. */
            break;
        }
        else
            optionp++;
    } /* End while more options */ if (!CKSUMERR)
    {
        /* Note: Here leave CKSUMERR off and let the few options
        ** which do validation turn it on if there is a problem. */ if (type == COMM_UPLOAD)
        {
            /* Reset response for sending back */
```

```c
Filename: COMMFUNC.C                                    Page 5 do_byte_assignment(&op_passcd_reg, type);

for (i = 0; i < MAXOPERS; i++)
     {
        do_str_assignment(op_pc_tab[i].passcode, SIZE_OF_OPERS, type);

/* If it's a download - clear flag */
        if (type == COMM_DNLOAD)
           op_pc_tab[i].flag = 0;
     } break;
  } /* End of switch */
  break;

case EXEC_CONFIG:
     switch (suffix)
     {
        case 'A':

if (type == COMM_UPLOAD)
              do_byte_assignment(&hi_exec_key_access, type);
           else
           {
              do_byte_assignment(&loc_byte, type);

/* Make sure we don't lock ourselves out ....
              ** Can only disable HI Key if ....
              ** Comm != NONE (that is one way of resetting)
              **    OR
              ** LO Key is enabled and have access to option 21
              */
              if (loc_byte == DISABLED && loc_byte != hi_exec_key_access)
              {
                 if ((comm_mode != NONE ||
                      (lo_exec_key_access == ENABLED && low_flg[CONFIGURR_R
XRC_OFFSET]))
                 {
                    hi_exec_key_access = loc_byte;
                 }
                 else
                 {
                    /* I'm sorry Dave ... I can't do that. */
                 }
              }
              else
                 hi_exec_key_access = loc_byte;
           }
           break;

case 'B':
           if (type == COMM_UPLOAD)
              do_byte_assignment(&lo_exec_key_access, type);
           else
              do_byte_assignment(&loc_byte, type);
```

```c
Filename: COMMFUNC.C                                    Page 6

/* Make sure we don't lock ourselves out
              ** Can only disable LO Key if ....
              ** Comm != NONE that is one way of resetting)
              **    OR
              ** HI Key is enabled
              */
              if ((loc_byte == DISABLED) &&
                  (loc_byte != lo_exec_key_access))
              {
                 if (comm_mode != NONE ||
                     (hi_exec_key_access == ENABLED))
                 {
                    lo_exec_key_access = loc_byte;
                 }
                 else
                 {
                    /* I'm sorry Dave ... I can't do that */
                 }
              }
              else
                 lo_exec_key_access = loc_byte;
           }
           break;

case 'C': /* Single Low Level Exec Option Access */
        case 'B': /* All Low Level Exec Option Access */

/* In an attempt to minimize code dup, I can 'slug'
           ** DNLOAD 1, DNLOAD ALL and UPLOAD 1 in first block
           ** but UPLOAD ALL is in the second block. */ if (type == COMM_DNLOAD || suffix == 'C')
           {
              i = 1;
              if (suffix == 'B')
                 i = 28;

for ( ; i > 0; i--)
              {
                 /* Pull out enabled/disabled byte */
                 if (type == COMM_DNLOAD)
                    do_byte_assignment(&loc_byte, type); /* isable/enable */
              }
              else
              {
                 response = cmdbuf + 9; /* point to Exec Option Number */

/* Which option are we talking about */

/* IMPORTANT -
                 ** SPECIAL - regardless of type, must pull out Exec Option from
                 ** incoming string.  Here loc_byte2 is actually option a
                 ** we want to pull out so always use DNLOAD */
                 do_byte_assignment(&loc_byte2, COMM_DNLOAD);

/* Prepare to load data into buf */
                 if (type == COMM_UPLOAD)
                    response = cmdbuf + 3;

suffix = loc_byte2; /* reuse suffix for lookup value */
```

```
06/16/1995 14:31    Filename: COMMFUNC.C                                Page 7 if ((int)suffix >= 1 && (int)suffix <= 5)
                        suffix--;
                    else if ((int)suffix >= 20 && (int)suffix <= 34)
                        suffix -= 14;
                    else if ((int)suffix >= 81 && (int)suffix <= 86)  /* Opt 1 rep
ort sub-options */
                        suffix -= 81;
                    if (type == COMM_UPLOAD)
                    {
                        do_byte_assignment(&opt1_flg[(int)suffix], type);
                        do_2byte_assignment(&loc_byte2, type);  /* suffix i
s option number */
                    }
                    else
                    {
                        opt1_flg[(int)suffix] = loc_byte;
                    }
                    /* No more checking for this sub option */
                    continue;
                }
                else if ((int)suffix >= 91 && (int)suffix <= 92)  /* opt 32 Fe
e table - sub-options */
                {
                    suffix -= 91;
                    if (type == COMM_UPLOAD)
                    {
                        do_byte_assignment(&opt32_flg[(int)suffix], type);
                        do_2byte_assignment(&loc_byte2, type);  /* suffix i
s option number */
                    }
                    else
                    {
                        opt32_flg[(int)suffix] = loc_byte;
                    }
                    /* No more checking for this sub option */
                    continue;
                }
                else
                {
                    CKSUMERR = TRUE;
                    continue;
                }
                if (type == COMM_DNLOAD)
                {
                    /* make sure we don't lock ourselves out
                    ** Can only disable Low Exec - Config Exec is if
                    ** Comm != NONE (that is one way of resetting)
                    **              OR
                    ** Hi Key is enabled
                    */
                    if ((suffix == CONFIGURE_EXEC_OFFSET) && (loc_byte ==
OFF) &&
                        (low_flg[(int)suffix] != loc_byte))
                    {
                        if (comm_mode != NONE ||
```

```
06/16/1995 14:31    Filename: COMMFUNC.C                                Page 8

(hi_exec_key_access == ENABLED))
                        {
                            low_flg[(int)suffix] = loc_byte;
                        }
                        else
                        {
                            /* I'm sorry Dave ... I can't do that */
                        }
                    }
                    else
                    {
                        low_flg[(int)suffix] = loc_byte;
                    }
                }
                else /* Do upload support */
                {
                    /* This upload handles 1 - 5 and 20 - 34 */
                    do_byte_assignment(&low_flg[(int)suffix], type);
                    do_2byte_assignment(&loc_byte2, type);  /* suffix is o
ption number */
                }
            } /* End of for */
        }
        if (type == COMM_DNLOAD)
        {
            /*
            ** Check for new access to "special" options.
            **
            ** NOTE: Order is important here since checks
            ** for Print Reports and Setup Fees can set one
            ** of the normal options which means checks for
            ** access to Setup should be last.
            */
            /* If any of sub options for 1 are set, enable Reports me
nu */
            low_flg[PRINT_REPORTS_OFFSET] = NO;  /* Reset Reports men
u */
            for (j = 0; j <= 5; j++)
            {
                if (opt1_flg[j])
                    low_flg[PRINT_REPORTS_OFFSET] = YES;  /* Enable rep
orts menu */
            }
            /* If any of sub options for 32 are set, enable Fee Table
 menu */
            low_flg[SETUP_FEE_TABLE_OFFSET] = NO;  /* Reset Fee Table
 menu */
            for (j = 0; j < 2; j++)
            {
                if (opt32_flg[j])
                    low_flg[SETUP_FEE_TABLE_OFFSET] = YES;  /* Enable s
etup menu */
            }
            /* if any of options 20-34 are set, enable setup menu */
            low_flg[SETUP_OFFSET] = NO;  /* reset the setup flag */
            for (j = MAXOPT_MINUS_1; j > 5; j--)
            {
                if (low_flg[j])
                    low_flg[SETUP_OFFSET] = YES;  /* Enable setup menu
```

```
        } /* End of checking "special" access options */
    } /* End of if DNLOAD 1, DNLOAD ALL, UPLOAD 1 */
    else
    { /* Must be an upload all */
        for (i = 0; i < MAXOPTS; i++)
        {
            /* Setup is special - skip over it */
            if (i == SETUP_OFFSET)
            {
                continue;
            }
            do_byte_assignment(&low_flg[i], type);
            suffix = i + 1;
            if (suffix >= 6)
                suffix += 13;
            /* Which option are we talking about */
            do_2byte_assignment(&suffix, type);
        } /* End if for normal setup access */
        for (i = 0; i < 6; i++)
        {
            do_byte_assignment(&opt1_flg[i], type);
            suffix = i + 81;
            /* Which option are we talking about */
            do_2byte_assignment(&suffix, type);
        } /* End for reports sub-menu access */
        for (i = 0; i < 2; i++)
        {
            do_byte_assignment(&opt2_flg[i], type);
            suffix = i + 91;
            /* Which option are we talking about */
            do_2byte_assignment(&suffix, type);
        } /* End for fee table sub-menu access */
    } /* End of upload all */
    break;
case 'D': /* Special one time use of [exec] keypad key */
    do_byte_assignment(&exec_key_access, type);
    break;
} /* End of switch on suffix */
break;
case CLOCK:
    do_2byte_assignment(&(curr_date.clk_date[0]), type);
    do_2byte_assignment(&(curr_date.clk_date[1]), type);
    do_2byte_assignment(&(curr_date.clk_date[2]), type);
    do_byte_assignment(&curr_date.clk_dow, type);
    do_time_ticks(&curr_date.clk_time, type);
    if (type == COMM_DNLOAD)
        set_rtc(0x0007); /* Set all three date/dow/time */
    break;
case TIMEOUTS:
    switch (suffix)
    {
    case 'A':
        do_byte_assignment(&op_time_out, type);
        break;
    case 'B':
        do_2byte_assignment(&ex_time_out, type);
        break;
    }
    break;
case OPLOCKOUT:
    do_byte_assignment(&op_lock_out, type);
    do_time_ticks(&op_lock_out_beg, type);
    do_time_ticks(&op_lock_out_end, type);
    break;
case CHANGE_CALC :
    switch (suffix)
    {
    case 'A':
        do_byte_assignment(&change_calc_reg, type);
        break;
    case 'B':
        do_2byte_assignment(&key_reset_dsply, type);
        break;
    }
    break;
case COMM_PORTS:
    switch (suffix)
    {
    case 'A':
        do_byte_assignment(&rpt_device, type);
        break;
    case 'B':
        do_2byte_assignment(&message_device, type);
        break;
    case 'C':
        do_byte_assignment(&lister_baud_index, type);
        do_byte_assignment(&flow_control_index, type);
        do_byte_assignment(&flow_control_line_index, type);
        /* Note : lister_timeout_value is 3 chars plus a null but
```

STD 617 PA                                                                      - 35 -

Filename: COMMFUNC.C                                                      Page 12

```
        case 'B':
            do_str_assignment(&comm_passwd, option_len, type);
            break;
        case 'C':
            do_byte_assignment(&dial_method, type);
            do_byte_assignment(&modem_std, type);
            break;
        case 'D':
            do_byte_assignment(&auto_ans, type);
            do_time_ticks(&auto_ans_beg, type);
            do_time_ticks(&auto_ans_end, type);
            do_days(&auto_ans_days, type);
            break;
        case 'E':
            do_byte_assignment(&auto_dial, type);
            do_time_ticks(&auto_dial_beg, type);
            do_time_ticks(&auto_dial_end, type);
            do_days(&auto_dial_days, type);
            break;
        case 'F':
            do_str_assignment(&pri_phone, option_len, type);
            break;
        case 'G':
            do_str_assignment(&sec_phone, option_len, type);
            break;
        }
        break;
    case DOCUMENTS:
        switch (suffix)
        {
        case 'A':
            do_ulong_assignment(&max_doc_val, option_len, type);
            break;
        case 'B':
            do_ulong_assignment(&max_ven_pymt, option_len, type);
            break;
        case 'C':
            do_uint_assignment(&pack_size, option_len, type);
            break;
        case 'D':
            do_byte_assignment(&pack_term, type);
            break;
        case 'E':
            do_byte_assignment(&doc_length, type);
            break;
        case 'F':
            do_byte_assignment(&stub_fmt, type);
            break;
```

Filename: COMMFUNC.C                                                      Page 11

```
    ** it is really a number, so we will dance around that here
    ** by hand converting. */
    tmp_uint = (unsigned int)atoi(lister_timeout_value);
    do_uint_assignment(&tmp_uint, 3, type);
    sprintf(lister_timeout_value, "%u", tmp_uint);
    do_byte_assignment(&lister_eol_index, type);
    break;
    case 'D':
        /* Do the 3 digits ASCII codes for EOL */
        for (i = 0; i < SIZE_OF_LISTER_EOL_USER_DEFINED - 1); i++)
        {
            tmp_uint = (unsigned int)lister_eol_choices[LISTER_EOL_USER_DEFINED][i] = (byte)tmp_u
            do_uint_assignment(&tmp_uint, 3, type);
            lister_eol_choices[LISTER_EOL_USER_DEFINED][i] = (byte)tmp_uint;
        }
        break;
    case 'E':
        do_byte_assignment(&rpt_cpi, type);
        break;
    case 'F':
        do_byte_assignment(&lstr_rpt_con, type);
        do_byte_assignment(&lstr_rpt_lines, type);
        do_byte_assignment(&audit_trail, type);
        break;
    case 'G':
        do_byte_assignment(&op_dly_close, type);
        break;
    case 'H':
        do_byte_assignment(&clr_acc_sumry, type);
        break;
    case 'I':
        do_byte_assignment(&auto_close, type);
        do_byte_assignment(&prt_auto_rpt, type);
        do_byte_assignment(&auto_lister_timeout_index, type);
        do_byte_assignment(&auto_rpt_copies, type);
        do_time_ticks(&auto_dly_time, type);
        do_days(&auto_dly_days, type);
        break;
    }
    break;
case COMM:
    switch (suffix)
    {
    case 'A':
        do_byte_assignment(&comm_mode, type);
        if (type == COMM_DNLOAD)
            COMM_CHANGED = TRUE;
        break;
```

STD 617 PA                                          - 36 -

```
                                    case SETUP_FEES :
                                      switch (suffix)
                                      {
                                      case 'A':
                                        do_byte_assignment(&fee_table, type);
                                        for (i = 0; i < SIZE_OF_FEE_TABLE; i++)
                                        {
                                          do_ulong_assignment(&fee_tabl[i].up_amount, 6, type);
                                          do_uint_assignment(&fee_tabl[i].rng_fee, 4, type);
                                        }
                                        break;
                                      case 'B':
                                        do_uint_assignment(&commission, option_len, type);
                                        break;
                                      }
                                      break;
                                    case SPECIAL_FUNC :
                                      switch (suffix)
                                      {
                                      case 'A':
                                        do_byte_assignment(&special_function, type);
                                        if (type == COMM_DNLOAD)
                                        {
                                          if (is_SPECIAL_FUNCTION(CONTINENTAL))
                                            SN_SIZE = 13;
                                          else
                                            SN_SIZE = 12;

if (is_SPECIAL_FUNCTION(MIDAMER))
                                            mid_america_defaults();
                                        }
                                        break;
                                      case 'B':
                                        do_byte_assignment(&doc_prt_fmt, type);
                                        break;
                                      case 'C':
                                        do_byte_assignment(&comm_rpt_fmt, type);
                                        break;
                                      case 'D':
                                        /* Note machine_no is 5 chars */
                                        do_str_assignment(machine_no, 5, type);
                                        break;
                                      case 'E':
                                        /* Note agent_no is 7 chars */
                                        do_str_assignment(agent_no, 7, type);
                                        break;
                                      case 'F':
                                        /* Note store_no is 4 chars */
                                        do_str_assignment(store_no, 4, type);
                                        break;
                                      case 'G':
```

```
                                      case 'G':
                                        do_byte_assignment(&check_dig, type);
                                        break;
                                      case 'H':
                                        do_byte_assignment(&courtesy_amt, type);
                                        break;
                                      case 'I':
                                        do_byte_assignment(&void_over, type);
                                        break;
                                      case 'J':
                                        do_byte_assignment(&seq_verify, type);
                                        break;
                                      case 'K':
                                        do_byte_assignment(&seq_check_dig, type);
                                        break;
                                      case 'L':
                                        do_2byte_assignment(&seq_num_tries, type);
                                        break;
                                      }
                                      /* Same processing as done in OPT_28 */
                                      /**
                                       *  determine the document format....
                                       *
                                       *  if the document width is 9.5 then set format to stub
                                       *  -JHK 2/28/91-
                                       *
                                       *  doc_format can be set to:
                                       *      0 - 7"
                                       *      1 - 8.5"
                                       *      2 - 9.5" no print
                                       *      3 - 9.5" side by side
                                       *      4 - 9.5" over/under
                                       *      5 - special
                                       */
                                      doc_format = doc_width;  /* reset incase of change */

/* if 9.5", add 1 to compensate for no stub */
                                      if (doc_width == 2)
                                        doc_format = stub_fmt + 2;

break;
                                    case VOID_AUTH:
                                      switch (suffix)
                                      {
                                      case 'A':
                                        do_byte_assignment(&void_auth, type);
                                        break;
                                      case 'B':
                                        do_byte_assignment(&void_on_jam, type);
                                        break;
                                      }
                                      break;
```

STD 617 PA                                          - 37 -

```
            /* Note chain_no is 7 chars */
            do_str_assignment(chain_no, 7, type);
            break;

case 'H':
            /* Note do_digits is 2 chars */
            do_str_assignment(do_digits, 2, type);
            break;
        }
        break;

case SECURITY_VAL:
        switch (suffix)
        {
        case 'A':
            do_uint_assignment(&max_poll, option_len, type);
            break;

case 'B':
            do_uint_assignment(&max_items, option_len, type);
            break;

case 'C':
            do_ulong_assignment(&max_amount, option_len, type);
            break;
        }
        break;

case HIDDEN:
        switch (suffix)
        {
        case 'A':
            do_2byte_assignment(&digit_pause, type);
            break;

case 'B':
            do_2byte_assignment(&redial_time, type);
            break;

case 'C':
            do_2byte_assignment(&rsep_time, type);
            break;

case 'D':
            do_2byte_assignment(&passwd_time, type);
            break;

case 'E':
            do_2byte_assignment(&cmd_time, type);
            break;

case 'F':
            do_str_assignment(user_id, option_len, type);
            break;

case 'G':  /* note: addr can only be chars 0-9 and A-F */
            /* UP and DN do same thing, return hex dump */
            if (type == COMM_UPLOAD)
                response = cmdbuf + 9;
```

```
                strncpy(tmp_comm_str, response, 4);
                tmp_comm_str[4] = '\0';
                if (sscanf(tmp_comm_str, "%x", &db_start_add) == EOF)
                    break;

strncpy(tmp_comm_str, response + 4, 4);
                tmp_comm_str[4] = '\0';
                if (sscanf(tmp_comm_str, "%x", &db_end_add) == EOF)
                    break;

if (db_start_add > db_end_add)
                {
                    CKSUMERR = TRUE;
                    break;
                }

/* For debug dump, dump_bytes actually formats and sends
                ** data.  So we don't try, we'll set type to DNLOAD. */
                type = COMM_DNLOAD;

REMCTRDBG = TRUE;
                dump_bytes(db_start_add, db_end_add);
                REMOTEDBG = FALSE;
            }  /* End of switch */ break;

default :
            CKSUMERR = TRUE;  /* option was not a number */

}  /* End of switch */

/* If it's an upload, then need to send it */
        if (type == COMM_UPLOAD && !CKSUMERR)
        {
            calc_cksum(cmdbuf);

/* Send it */
            strcat(cmdbuf, "\377");
            put_comm_str(cmdbuf);
        }

}  /* End of if found a valid option */

/* Prepare message */
    sprintf(tmp_comm_str, up_dnload_spr,
        (type == COMM_DNLOAD) ? dnload_msg : upload_msg,
        save_option, save_suffix,
        CKSUMERR ? ERROR_STR : COMPLETE_STR);

/* Post status message */
    put_list_display_str(tmp_comm_str, -1, &msg_cnt);

if (type == COMM_DNLOAD && !CKSUMERR)
    {
        put_comm_char(ACK);
        put_comm_str(CR_LF);
    }

/*
** NOTE : don't reset CKSUMERR for other places.  The main comm
** loop will put out error message to comm and reset it for us.
*/
```

```
/****************************************************
 * void init_modem
 *
 * Initializes modem for communications
 *
 * If messages = VERBOSE then give alot of messages about what is being
 * sent/received.
 ****************************************************/
void init_modem(int messages, byte passed_in_baud_rate_index)
{
    char s[21];

clr_dsply00(INITIALIZING_MODEM);

/* Make sure we have port and baud correct */
    TR1 = FALSE;
    UARTMOD = MODEM;
    TH1 = baud_rate_table[passed_in_baud_rate_index];
    TR1 = TRUE;

put_comm_list_str("Attention", attention, messages);
    put_comm_list_str("Reset", reset_modem, messages);
    sprintf(s, setup_modem, (int)digit_pause, (int)modem_std);
    if (put_comm_list_str("Setup", s, messager) != OK_STATUS)
    {
        MODEMINIT = FALSE;
        press_clear(MODEM_INIT_FAILED);
        nap_20(250);  /* Nap for 5 secs */
    }
    else
    {
        MODEMINIT = TRUE;
        dsply_str10(MODEM_INIT_OK);
    }
}

/****************************************************
 * char ans_dial_status()
 *
 * Removes old ring status from buffer and waits for answer or dial status.
 * Returns result code 1 if modem connects or 3 if no carrier is detected.
 * A 10 second delay is possible if modem does not connect.
 ****************************************************/
char ans_dial_status(void)
{
    char c;
    int cnt = 13;  /* 13 * 4secs per modem_status call = 32 secs */ while (cnt > 0)
    {
        c = modem_status(QUIET, NO_WAIT);

if (c == RING_STATUS)
        {
            /* Pull out all RINGs */
        }
        else
        if (c != NULLCHAR) /* Return whatever we received */
            break;
        else
        {
```

```
/* Must have timed-out, so wait some more */
            cnt--;
        }
    }
    return(c);
} char dial()
{
    /****************************************************
     * Dials passed phone number. Phone number can include
     * dashes and commas for pause between digits. Returns result code 1 if modem
     * connects or 3 if no carrier is detected
     ****************************************************/
    char dial(char *phone_number)
    {
        put_comm_str(dial_modem);

if (dial_method)
            put_comm_char("T:");
        else
            put_comm_char("P:");

put_comm_str(phone_number);
        put_comm_char((char)0x0D);

return(ans_dial_status());   /* 30 second delay possible */
    }

/****************************************************
     * void hangup()
     *
     * Terminates the phone session.
     ****************************************************/
    void hangup(void)
    {
        put_modem_esc_seq();
        put_comm_list_str("Hangup", hang_up, QUIET);

/* If we connected at something other than the configured baud rate, we
        ** will get messed-up. The modem continues to "talk" to us at the trained
        ** baud rate - which is different than we are supposed to be listening.
        ** The typical response was - can connect after an init but once called
        ** couldn't get connected again until next init.
        **
        ** So, we'll retrain the modem here after each hangup. */

TR1 = FALSE;
        TH1 = baud_rate_table[baud_rate_index];
        TR1 = TRUE;
        put_comm_list_str("Attention", attention, QUIET);
    }

/****************************************************
     * void put_modem_esc_seq(void)
     *
     * Terminates the phone session
     ****************************************************/
    void put_modem_esc_seq(void)
    {
```

STD 617 PA                                                           - 39 -

```
06/16/1995 14:31        Filename: COMMFUNC.C                          Page 19 nap_20(100);  /* delay 2 sec */
    put_comm_str(modem_escape);
    nap_20(100);  /* delay 2 sec */
}

/***********************************************************************
**  put_comm_list_str
**
**  This function will:
**    1. Print messages to output device based on config
**    2. Put chars to comm port
**    3. Wait get/return result
***********************************************************************/
char *put_comm_list_str(char *desc, char *str, int do_messages)
{
    if (do_messages == VERBOSE)
    {
        sprintf(tmp_comm_str, "Sending %s\n", desc);
        put_str(tmp_comm_str, message_device);
        put_str(str, message_device);
        put_str("\377", message_device);
    }
    put_comm_str(str);
    return(modem_status(do_messages, YES_WAIT));
}

/***********************************************************************/
int get_char_timed(int timeout, char *cp)
{
    int ret = -1;
    int cnt = 0;

cnt = timeout * 50;  /* Set timer for (timeout x 1 second) */
    do
    {
        if ((ret = get_comm_char(cp)) != -1)
            break;
        else
        {
            /* If don't need to call nap - DON'T - it will screw up TIMER1
            ** for anybody else. */
            if (timeout != 0)
                nap_20(1);
        }
    } while (cnt-- > 0);
    return(ret);
}

/***********************************************************************
**  char modem_status(int messages)
**
**  Waits for modem digital result code and CR. This function returns a result
**  code or a NULL character if the modem does not reply with a result code in
**  4 secs. This function is called after a command is sent to the modem.
***********************************************************************/
char modem_status(int messages, int do_wait)
```

```
06/16/1995 14:31        Filename: COMMFUNC.C                          Page 20

{
    char c = NULL_CHAR;
    char read_str[MAX_MODEM_READ_CHARS];
    char *read_char = read_str;
    int result_cnt;
    int cnt = 1, t1;
    char rtn;

/* Use counter to tick off time */ t1 = 200;  /* = 200 * 20ms = 4000ms (ie 4 secs) */
    memset(tmp_comm_str, '\0', 21);
    result_cnt = 0;

while (t1 > 0 && cnt < MAX_MODEM_READ_CHARS)
    {
        if (get_comm_char(read_char) != -1)
        {
            if (do_wait == YES_WAIT && tmp_comm_str[result_cnt - 1] == CR)
            {
                memset(tmp_comm_str, '\0', 21);
                result_cnt = 0;
            }
            if (result_cnt < 20)
                tmp_comm_str[result_cnt++] = *read_char;
            if (*read_char == CR)
            {
                if (do_wait == NO_WAIT)
                    break;
            }
            cnt++;
            read_char++;
        }
        nap_20(1);  /* Sleep 20 ms */
        t1--;
    }
    *read_char = '\0';

/* Debug statements for modem responses */
    if (messages == VERBOSE)
    {
        put_str("\377Recving:\377", message_device);
        read_char = read_str;
        while (*read_char)
        {
            if (*read_char == 0x0D)
                put_str("CR", message_device);
            else if (*read_char == 0x0A)
                put_str("LF", message_device);
            else
                put_list_char(*read_char, message_device);
            read_char++;
        }
        put_str("\n\377", message_device);
    }
}
```

STD 617 PA                                                          - 40 -

```
06/16/1995 14:31        Filename: COMMFUNC.C                                Page 22 put_list_display_str(done_xmit, 1, msg_cnt);
    log_date();
    linefeed(2, message_device);

/* Shut everything off */
    purge_comm(2);

COMMACTIVE =
    CONNECT =
        CONNECT_PENDING =
            RS232COMM =
                MANUALAN =
                    MANUALDIAL = FALSE;
}

/***************************************************************************
 * calc_cksum
 *
 * This function is used to calculate the strange 2 digit check sum
 ***************************************************************************/
void calc_cksum(byte *message)
{
    int ck_sum = 0;
    byte ck_remainder, l_ck_sum, r_ck_sum;

while (*message != '\0')
        ck_sum += *message++;

ck_remainder = ck_sum - ((ck_sum % 256) * 256);
    l_ck_sum = (ck_remainder / 16) + 48;
    r_ck_sum = ck_remainder - ((ck_remainder / 16) * 16) + 48;

*message++ = l_ck_sum;
    *message++ = r_ck_sum;
    *message = '\0';
}

/***************************************************************************
 * get_resp
 *
 * This function is used to compare the comm response character to either
 * CR or ENQ, or time out waiting for it.
 ***************************************************************************/
char get_resp(char c, byte time_to_wait)
{
    char read_char = NULLCHAR;

/* Instead of nap use TIMER1 */

/* if time_to_wait == 0 then it is disabled (ie. no timeout) */
    if (time_to_wait == 0)
        TIMER1 = -1L;
    else
        TIMER1 = (long)(time_to_wait * 50); /* time_to_wait is in seconds, convert
                                               to 20 ms */
    do
    {
        get_char_timed(0, &read_char);

if (read_char == c)
            break;
```

```
06/16/1995 14:31        Filename: COMMFUNC.C                                Page 21

/* Figure out what we have */
    rtn = NULLCHAR;

/* Must end w/ CR */
    if (tmp_comm_str[strlen(tmp_comm_str) - 1] == CR)
    {
        sscanf(tmp_comm_str, "%d", &result_cnt);
        rtn = (char)result_cnt;
        break;
    } return(rtn);
}

/***************************************************************************/
void wait_get_comm(char char1)
{
    char read_char;

do
    {
        get_comm_char(&read_char);
        if ((read_char & 0x7F) == char1)
            break;

} while (TIMER2 != 0L);
}

/***************************************************************************/
void purge_comm(int wait_cnt)
{
    char cp;

/* Wait for 2 secs of quiet */
    while (get_char_timed(wait_cnt, &cp) != -1)
        ;
}

/***************************************************************************
 * dsply_ver_cmd
 *
 * Put Version Number to comm port.
 ***************************************************************************/
void dsply_ver_cmd(void)
{
    char d_str[42];

sprintf(d_str, "%p\377%s\377", VERSION, VER_DATE);
    put_comm_str(d_str);
}

/***************************************************************************
 * void end_cmd()
 *
 ***************************************************************************/
void end_cmd(int *msg_cnt)
{
    /* This compares to !RS232COMM is VITAL to working from FLASH <-> EPROM
    ** since we don't save bit field info. We do know based on comm_mode
    ** if it was RS232 though. */ if (COMMACTIVE && !RS232COMM)
        hangup();
```

STD 617 PA                                                        - 41 -

```c
     } while (TIMER1 != 0L);
     if (TIMER1 == 0L)
         put_list_redial(redp_timeout);

return(read_char);
}

/*********************************************************/
void do_byte_assignment(byte *parameter, int type)
{
    if (type == COMM_UPLOAD)
    {
        *response++ = *parameter + 0x30;  /* Convert from numeric to ascii */
        *response = '\0';                  /* Keep it null terminated */
    }
    else
    {
        *parameter = *response++ - 0x30;   /* Convert from ascii to numeric */
    }
}

/*********************************************************
 * do_2byte_assignment
 *
 * This function converts 2 ASCII characters from cmdbuf to a byte value or
 * converts a byte to 2 ASCII codes and puts it in cmdbuf.
 *********************************************************/
void do_2byte_assignment(byte *parameter, int type)
{
    if (type == COMM_UPLOAD)
    {
        sprintf(response, "%02d", (int)*parameter);
        response += 2;                     /* Move past new data */
        *response = '\0';                  /* Keep it null terminated */
    }
    else
    {
        *parameter = (*response++ - 0x30) * 10;
        *parameter += (*response++ - 0x30);
    }
}

/*********************************************************/
void do_str_assignment(char *parameter, int len, int type)
{
    int space_cnt = 0;

/* Take care of padding w/ spaces */
    if (type == COMM_UPLOAD)
    {
        for ( ; len > 0; len--)
            *response++ = ' ';
        *response = '\0';                  /* Keep it null terminated */
    }
    else
    {
        while (isspace(*response) && space_cnt < len)
        {
            response++;
            space_cnt++;
        }
```

```c
        if (type == COMM_UPLOAD)
        {
            /* Space filled whole thing, so back up enough to insert parameter */
            response -= strlen(parameter);
            strcpy(response, parameter);
            /* Reposition response to end of string */
            response += strlen(parameter);
            *response = '\0';              /* Keep it null terminated */
        }
        else
        {
            strncpy(parameter, response, (len - space_cnt));
            *(parameter + (len - space_cnt)) = '\0';
            response += (len - space_cnt);
        }
    }
}

/*********************************************************/
void do_ulong_assignment(unsigned long *parameter, int len, int type)
{
    char loc_str[20];

if (type == COMM_UPLOAD)
    {
        sprintf(response, "%0*lu", len, *parameter);
        response += len;
        *response = '\0';                  /* Keep it null terminated */
    }
    else
    {
        strncpy(loc_str, response, len);
        loc_str[len] = '\0';
        *parameter = (unsigned long)atol(loc_str);
        response += len;
    }
}

/*********************************************************/
void do_bin_assignment(byte *parameter, int len, int type)
{
    if (type == COMM_UPLOAD)
    {
        memcpy(response, parameter, len);
    }
    else
    {
        memcpy(parameter, response, len);
    }
    response += len;
}

/*********************************************************/
void do_uint_assignment(unsigned int *parameter, int len, int type)
{
    char loc_str[20];

if (type == COMM_UPLOAD)
    {
        sprintf(response, "%0*u", len, *parameter);
        response += len;
```

```c
                                                                    Page 25
06/16/1995 14:31          Filename: COMMFUNC.C

*response = '\0';   /* Keep it null terminated */
    else
    {
        strncpy(loc_str, response, len);
        loc_str[len] = '\0';
        *parameter = (unsigned int)atoi(loc_str);

response += len;
    }
}

/*****************************************************************************
 * do_days
 *
 * This function is used to write enable/disable status for days of the week
 *****************************************************************************/
void do_days(byte *array, int type)
{
    int i;

for (i = 0; i < 7; i++)
    {
        do_byte_assignment(&array[i], type);
    }
}

/*****************************************************************************
 * do_time_ticks
 *
 * This function is used to convert military time to minutes (ticks) or
 * visa versa.
 *****************************************************************************/
void do_time_ticks(int *parameter, int type)
{
    byte tmp_byte;

if (type == COMM_UPLOAD)
    {
        /* First Hours */
        tmp_byte = (byte)(*parameter / 60);
        do_2byte_assignment(&tmp_byte, type);

/* Now minutes */
        tmp_byte *= 60;
        tmp_byte = (byte)(*parameter - tmp_byte);
        do_2byte_assignment(&tmp_byte, type);
    }
    else
    {
        do_2byte_assignment(&tmp_byte, type);
        *parameter = tmp_byte * 60;       /* convert hours to minutes */ do_2byte_assignment(&tmp_byte, type);
        *parameter += tmp_byte;
    }
}

/********************************* END OF COMMFUNC.C ************************/
```

STD 617 PA                                    - 43 -

```
06/10/1995 13:38          Filename: GENERAL.C                    Page 3
```

```
/* Initial revision
*/
#include "8032.h"
#include "const.h"
include "constdat.h"
#include "struct.h"
#include "data.h"
#include "io.h"
#include "proto.h"

#include <stdio.h>
#include <stdlib.h>
#include <string.h>
#include <ctype.h>
```

```
/***************************************************************
**
**   NAME         : get_dsply_num
**
**   DESCRIPTION  :
**      This routine will accept numeric input until the maximum
**      length is reached or a valid non-numeric is pressed
**
**   PARAMETERS   :
**   end_display_at :  Tells module where to justify numeric display.
**                     In most cases this is full right justification.
**
**   max           :  maximum number of numerics allowed
**
**   key_flg       :  flag which contains the a masked value of all
**                    supported key (all other key are ignored)  The
**                    break down of this flag is as follows:
**
**      bit  -   1 1 1 1 1 1
**              |5|4|3|2|1|0|9|8|7|6|5|4|3|2|1|0|   key(s) supported
**              +-+-+-+-+-+-+-+-+-+-+-+-+-+-+-+-+
**                                          |-----> numeric (0)
**                                        |-------> ENTER (1)
**                                      |---------> ESC (2)
**                                    |-----------> CLEAR (3)
**                                  |-------------> EXEC (if enabled)
**                                |---------------> PREV/NEXT
**                              |-----------------> OPTION (5)
**                            |-------------------> SERVICE (6)
**                          |---------------------> Access Modem Codes
** (7)
**                      |-------------------------> Use editing (8)
**                                                  Reserved for
**                                                  future use
**
** (11)Secured Entry
** (14)Don't clear Bot ---+
** (15)                   |
**
**   passed_str   :   the pointer to the input string
**
**   top_line     :   message to be displayed on the top line
**
**   RETURNS
**      char     :   The first valid non numeric key pressed
***************************************************************/
byte get_dsply_num (int end_display_at, byte max_len, int key_flg, char passed_st
r[], char top_ln[])
{
   byte str_cnt;
```

```
06/10/1995 13:38          Filename: GENERAL.C                    Page 4
```

```
   char inkey;
   char numeric_str[21];
   char blank_str[21];
   int  editing = FALSE;
   int  clear_from;
   byte modem_code_index;
   char rtn_val;
   int  i;

/* Initialize */
   str_cnt = 0;
   strcpy(numeric_str, passed_str);

/* Use editing feature which places '*' before field */
   if (key_flg & 0x0100)
      editing = FALSE;
   else
      editing = TRUE;

if ( !(key_flg & 0x2000) ) /* Unless passcode entry */
      enable_cur();

/* If 3rd bit of the high byte of key flag is set then
   ** don't write over the bottom line of the display
   ** Until a key is pressed !!! */
   strcpy(blank_str, BLANK_LINE);
   if ( !(key_flg & 0x4000))
   {
      clear_from = 0;
   }
   else
   {
      clear_from = end_display_at - max_len;
      blank_str[max_len] = '\0';
   }

/*********************************************
   ** Begin looping until data is
   ** accepted or other control key
   ** is pressed
   *********************************************/
   for (;;)
   {
      /*
      ** Take care of top line
      */

/* If the passed top line is null then don't re_write top line */
      if (top_ln[0] != '\0')
      {
         clr_dsply_ln0();
         dsply_strb0(top_ln);
      }
      if (TIME_PROMPT)
      {
         time_change = TRUE;
         disable_cur();
      }
      else
      {
      /*
      ** Take care of bottom line
      */
```

STD 617 PA                                                          - 44 -

```
06/10/1995 13:38    Filename: GENERAL.C                              Page 6

/* First time ENTER is pressed, we change from view -> edit mode */
            if (!editing)
            {
                editing = TRUE;
            }
            else
            {
                strcpy(passed_str, numeric_str);
                disable_cur();
                return(inkey);
            }
            break;

case SERVICE :
            if (key_flg & 0x0040)
            {
                disable_cur();
                return(inkey);
            }
            break;

case EXEC :
            if (key_flg & 0x0010)
            {
                if (
                    (INIT_PROMPT && (exec_key_access & 1))
                    ||
                    (EXECMODE == LOW) && (exec_key_access >= 2))
                   )
                {
                    if (EXECMODE == LOW)
                        HI_EXEC_BUTTON = TRUE;
                    else
                        EXEC_BUTTON = TRUE;

disable_cur();
                    return(inkey);
                }
            }
            break;

case CLEAR :
            /* If editing and CLEAR is allowed */
            if (editing && key_flg & 0x0008)
            {
                numeric_str[0] = '\0';
                str_cnt = 0;
                if (TIME_PROMPT)
                    time_change = TRUE;
            }
            break;

case PRINT :
            /*
            ** Verify PRINT key support.
            ** Will give access to special modem codes for use when
            ** setting up phone numbers.
            */
            if (key_flg & 0x0080)
            {
                modem_code_index = 0;  /* Can always default to top of list */
```

```
06/10/1995 13:38    Filename: GENERAL.C                              Page 5

*/
            dsply_str('clear_from, blank_str);

/* To signify editing, place '+' ahead of string */
            dsply_str(end_display_at - max_len - 1,
                editing ? EDITING_SYMBOL : NOT_EDITING_SYMBOL);

/* If 2nd bit of the hi byte of the key flag is set
               then display X's in place of key... */
            if (key_flg & 0x2000)
            {
                for (i = 0; i < str_cnt; i++)
                {
                    dsply_str(end_display_at - str_cnt + i, get_dsply_num_1);
                }
            }
            else
            {
                /* Display the current input from the right... */
                dsply_str((int)(end_display_at - strlen(numeric_str)), numeric_str);
            }
        }

/*
        ** Get User Input
        */
        inkey = get_key();

if (!inkey)
            return(0);

/*******************************************************
        ** If we have a "number" key pressed,
        ** then add it to the data
        *******************************************************/
        if (editing && isdigit(inkey))
        {
            /* Erase prior input data on the bottom line... */
            if (str_cnt == 0)
            {
                if (TIME_PROMPT)
                {
                    TIME_PROMPT = FALSE;
                    clr_dsply_ln1();
                }
            }

/* Is the maximum length of input reached? */
            if (str_cnt < max_len)
            {
                numeric_str[str_cnt] = inkey;  /* Add input to string */
                numeric_str[++str_cnt] = '\0';  /* NULL terminate input string */
            }
        }  /* End of if a digit */

/* Validate control keys (if valid non-numeric key then return) */
        switch (inkey)
        {
            case ENTER :
```

STD 617 PA                                           - 45 -

```
06/10/1995 13:38          Filename: GENERAL.C                    Page 8

**  NAME         :  press_ee
**
**  DESCRIPTION  :  Displays "Press ENTER or ESC" prompt and processed key.
**
**  PARAMETERS
**      txt_lno  :  message to be displayed on the top line
**
**  RETURNS
**      char     :  returns either an ESCAPE or ENTER depending on
**                  which key was pressed
**
*****************************************************************************/
char press_ee (char *top_line)
{
    char inkey;

clr_dsply00 (top_line);
    dsply_str10 (Press_ENTER_or_ESC);

do
    {
        inkey = get_key();

/* If an event occurred then exit.... */
        if (!inkey)
            return(0);

} while ((inkey != ENTER) && (inkey != ESCAPE));

return (inkey);
}

/*****************************************************************************
**
**  NAME         :  select_0_1
**
**  DESCRIPTION  :  This routine allow the toggling and selection of 1 of 2
**                  choices in a menu.
**
**                  Made change to return values - 1-18-93
**
**  PARAMETERS
**      opt_pos  :  the current option position
**      paramptr :  the current system byte to be change
**      dsp_flg  :  flag indication which menu to dislay
**      txt_line :  message to display on top line
**
**  RETURNS
**      char     :  the valid key that was pressed (after selection)
**
**  NOTE : These are special because they take arrays of ptr's to char that
**  we have declared code space, to work without warnings, proto's need
**  keyword "code" as part of type ++/
*****************************************************************************/
char select_0_1(byte *paramptr, char code *dsp_menu[], char top_line[])
{
    byte save = *paramptr;
    char inkey;
    int redisplay = TRUE;
    int editing = FALSE;
    char display_str[21];
```

```
06/10/1995 13:38          Filename: GENERAL.C                    Page 7 rtn_val = sel_item(NUM_OF_MODEM_CODES, &modem_code_index, MODEM_CO
DES_STR, modem_code_menu, 0x0000);

if (rtn_val == ENTER)
en)     {
            if (str_cnt + strlen(modem_code_menu[modem_code_index]) > max_l
            {
                /* Can't let user choose, because there isn't room */
                press_clear(WOULD_BE_TOO_LONG_STR);
            }
            else
            {
                strcat(numeric_str, modem_code_menu[modem_code_index]);
                str_cnt += strlen(modem_code_menu[modem_code_index]);
            }
        }
        break;

case ESCAPE :
            /* If editing is allowed and is invoked */
            if (key_flg & 0x0100 && editing)
            {
                strcpy(numeric_str, passed_str);
                str_cnt = 0;
                editing = FALSE;
            }
            else
            {
                if (!ISQMENU)
                {
                    disable_cur();
                    return(inkey);
                }
            }
        break;

case NEXT_OPTION :
        case PREV_OPTION :
            /* If we aren't supposed to edit or
            ** if we are but aren't yet editing ...
            */
            if (((key_flg & 0x0100) == 0) ||
                 ((key_flg & 0x0100) && !editing))
            {
                if (key_flg & 0x0020)
                {
                    disable_cur();
                    return(inkey);
                }
            }
        break;
    } /* End of switch */
} /* End of for ;; */
```

STD 617 PA                                                        - 46 -

```
06/10/1995 13:38      Filename: GENERAL.C                          Page 9 if (top_line[0] != '\0')
    clr_dsply00(top_line);

for (;;)
{
    /* If we are editing, build display with '*'s */
    if (!editing)
    {
        sprintf(display_str, "%s%s",
            editing ? EDITING_SYMBOL : NOT_EDITING_SYMBOL, dsp_menu[save]);
        clr_dsply_str10(display_str);
        redisplay = FALSE;
    } inkey = get_key();

/* If a event occurred then exit ... */
    if (!inkey)
    {
        return(0);
    }
    switch (inkey)
    {
        case ENTER :
            if (!editing)
            {
                editing = TRUE;
                redisplay = TRUE;
            }
            else
            {
                *parampti = save;
                curr_opt++;
                return(inkey);        /* exit!! */
            }
            break;

case PREV_OPTION :
        case NEXT_OPTION :    /* This replaces PREV_ITEM and NEXT_ITEM */
            if (editing)
            {
                /* Since current selection is either 0 or 1 ... */
                if (save == 0)
                    save = 1;
                else
                    save = 0;

redisplay = TRUE;
            }
            else
            {
                if (inkey == PREV_OPTION)
                    curr_opt--;
                else
                    curr_opt++;

return(inkey);    /* exit!! */
            }
            break;

case ESCAPE :
            /* If we are editing, then redisplay original value */
            if (editing)
                editing = FALSE;
```

```
06/10/1995 13:38      Filename: GENERAL.C                          Page 10 save = *parampti;
            redisplay = TRUE;
        }
        else
        {
            curr_opt = inkey;
            return(inkey);    /* exit!! */
        }
        break;

} /* End of switch */

} /* End of while not exit menu */

}

/*****************************************************************************
NAME           :  select_dow DESCRIPTION    :  This routine allows the toggling and selection of 1 of 2
                  choices in a menu for each day of the week.

PARAMETERS     :
    byte_dow   :  the array of system byte values
    txt_ln0    :  message to display on top line
    pos        :  allows caller to specify which day to start on.

RETURNS        :
    char       :  ENTER if all days of the week selected,
                  else an ESCAPE (0 if timeout).
*****************************************************************************/ char select_dow (byte byte_dow[], char *top_line, int pos)
{
    char inkey;
    byte save = byte_dow[pos];
    int  redisplay = TRUE;
    int  editing = FALSE;
    char display_str[21];

for (;;)
    {
        /* If we are editing, build display with '*' */
        if (!redisplay)
        {
            sprintf(display_str, "%s %s", top_line, D_O_W[pos]);
            clr_dsply0(display_str);
            sprintf(display_str, "%s%s",
                editing ? EDITING_SYMBOL : NOT_EDITING_SYMBOL, YES_NO[save]);
            clr_dsply_str10(display_str);
            redisplay = FALSE;
        } inkey = get_key();

/* If a event occurred then exit ... */
        if (!inkey)
            return(0);

switch (inkey)
        {
            case ENTER :
                if (!editing)
```

```
/***********************************************************************
 *
 *  NAME           : sel_item
 *
 *  DESCRIPTION
 *      This routine allow the selection of an item in a given menu
 *
 *  PARAMETERS
 *      opt_pos       :  current option position
 *      passed_byte   :  the system byte contain the menu position
 *      menu_cnt      :  the number of items in the menu
 *      dsp_flg       :  flag indication which menu to display
 *      txt_lno       :  message to display on top line
 *      key_flg       :  flag which contains the a masked value of all
 *                       supported features :
 *
 *                  bit  |15|14|13|12|11|10|9|8|7|6|5|4|3|2|1|0|  feature
 *                                                         |--- Editing (0)
 *                                                         |---- No ESCAPE (1)
 *                                                         |---- Don't use get_key
 *                                                              Special buffer proces
 *  sing (2)
 *
 *  RETURNS
 *      byte  -  the next option position or an ESCAPE if pressed
 *
 ***********************************************************************
 *
 *  NOTE : These are special because they take arrays of ptrs to char that
 *         we have declared code space, to work without warnings, proto's need
 *         Keyword "code" as part of type **/
char sel_item(byte menu_len, byte *passed_byte, char *txt_lno, char code *dsply_m
enu[], int key_flg)
{
  byte inkey;
  byte save = *passed_byte;        /* preserve the address */
  int  redisplay = TRUE;
  int  editing;
  char display_str[22];

/* Use editing feature which places '*' before field */
  if (key_flg & 0x0001)
    editing = FALSE;
  else
    editing = TRUE;

clr_dsply00 (txt_lno);

/*
  ** Start looping
  */
  for (;;)
  {
    if (redisplay)
    {
      sprintf(display_str, "%s%s",
              editing ? EDITING_SYMBOL : NOT_EDITING_SYMBOL, dsply_menu[save]);
      clr_dsply_mstr10(display_str);

redisplay = FALSE;
```

```
        editing = TRUE;
        redisplay = TRUE;
      }
      break;
    }
    else
    {
      byte_dow[pos] = save;
      editing = FALSE;

/* !!! Don't break here, fall thru to NEXT_OPTION
      ** Pressing ENTER will accept input and move to next
      ** prompt (ie. to move to next, perform same logic in
      ** NEXT_OPTION
      */
      if (pos == 6)
        return (inkey);

inkey = NEXT_OPTION;
    }
  case PREV_OPTION :
  case NEXT_OPTION :
    if (editing)
    {
      /* Since current selection is either 0 or 1 .... */
      if (save >= 0)
        save = 1;
      else
        save = 0;
    }
    else
    {
      if (inkey == NEXT_OPTION)
        pos++;
      else
      if (inkey == PREV_OPTION)
        pos--;

if (pos > 6 || pos < 0)
        return(inkey);        /* exit!! */ save = byte_dow[pos];
    }

/* Always redisplay based on possible reasons to be here */
    redisplay = TRUE;
    break;

case ESCAPE :
    if (editing)
    {
      editing = FALSE;
      redisplay = TRUE;
    }
    else
      return (inkey);          /* exit!! */
  }
} /* end of switch */
} /* end of for (;;) */
```

```
06/10/1995 13:38         Filename: GENERAL.C                         Page 13 inkey = get_key();

/* If an event occurred then exit... */
if (!inkey)
    return (0);

switch (inkey)
{
    case ENTER :
        if (!editing)
        {
            editing = TRUE;
            redisplay = TRUE;
        }
        else
        {
            *passed_byte = save;
            curr_opt--;
            return(inkey);
        }
        break;

case NEXT_OPTION :
        if (editing)
        {
            save++;
            /* Check wraparound menu */
            if (save == menu_len)
                save = 0;
        }
        else
        {
            redisplay = TRUE;
            curr_opt++;
            return(inkey);
        }
        break;

case PREV_OPTION :
        if (editing)
        {
            save--;
            /* Check wraparound menu */
            if (save == 0xFF)
                save = menu_len - 1;
        }
        else
        {
            redisplay = TRUE;
            curr_opt--;
            return(inkey);
        }
        break;

case ESCAPE:
        if (!(key_flg & 0x0002))  /* Is ESCAPE Allowed */
        {
            if ((key_flg & 0x0001) && editing)
```

```
06/10/1995 13:38         Filename: GENERAL.C                         Page 14

{
                /* reset to original value */
                save = *passed_byte;
                editing = FALSE;
                redisplay = TRUE;
            }
            else
            {
                curr_opt = ESCAPE;
                return(inkey);  /* exit!! */
            }
        }
} /* End of switch */

} /* End of for (;;) */

/*************************************************************
*
*  NAME         :   check_printer
*
*  DESCRIPTION  :   This routine will check the current status of the secure
*                   printer and if a fault (jam?) or a paper out is detected,
*                   the appropriate error message is displayed.
*
*  PARAMETERS   :
*                   none
*
*  RETURNS      :
*                   0   -   no error detected
*                   1   -   error was detected
*
**************************************************************/
byte check_printer(void)
{
    byte ptr_busy = TRUE;
    int  jam_cnt = 500;

while (ptr_busy && --jam_cnt)
    {
        if (chk_ptr_status ())
            return (1);

/* check printer busy status... */
        if (!(PSTATUS & 0x01))
            ptr_busy = FALSE;

delay (1);
    }

/* check paper end bit... */
    if (!ptr_busy)
    {
        fix_press_clear (PPRINTER_JAM_STP);
        reset_printer();
        return (1);
    } return (0);
}
```

STD 617 PA                                                              - 49 -

```
06/10/1995 13:38     Filename: GENERAL.C                             Page 15
/***************************************************************************
 *  NAME           : chk_ptr_status
 *
 *  DESCRIPTION    : This routine will check the current status of the secure
 *                   printer and if a fault or a paper out is detected
 *                   the appropriate error message is displayed
 *
 *  PARAMETERS
 *      none
 *
 *  RETURNS
 *      0  -  no error detected
 *      1  -  error was detected
 *
 ***************************************************************************/
byte chk_ptr_status ()
{
    /* check paper end bit... */
    if (PSTATUS & PRINTER_PAPER_OUT)
    {
        fix_press_clear (PRINTER_PAPER_OUT_STR);
        reset_printer();
        return (1);
    }

/* check fault bit... */
    if (!(PSTATUS & PRINTER_FAULT))
    {
        fix_press_clear(PRINTER_JAM_STR);
        reset_printer();
        return(1);
    }
    return (0);
}

/***************************************************************************
 *  NAME           : reset_printer
 *
 *  DESCRIPTION    : This routine will reset the EPSON printer.
 *
 *  PARAMETERS
 *      none
 *
 *  RETURNS
 *      none
 *
 ***************************************************************************/
void reset_printer(void)
{
    int i;

if (PSTATUS & PRINTER_PAPER_OUT)
        press_clear (PRINTER_PAPER_OUT_STR);

CONTROL = RESET_STROBE;
    delay (7);
    CONTROL = RESET_PTR;
    delay (7);
    CONTROL = RESET_STROBE;
    delay (7);
```

```
06/10/1995 13:38     Filename: GENERAL.C                             Page 16

PTRDY = TRUE;

/* initializes parallel printer.  Must be reset at least 50 ms. */
    /* wait for power-up reset to finish - JHK */
    /* delay up to 3 seconds */
    JAM = TRUE;
    i = 0;
    while (!(i++ < 1800 && JAM))
    {
        if (!(PSTATUS & EXDIR))
            JAM = FALSE;
        delay (2);
    }

/* if reset failed the report error and stop... */
    if (JAM)
    {
        clr_dsply00(PRINTER_ERROR_msg);
        dsply_str10(CALL_SERVICE_OFFICE);
        for (;;);
    }

PRINTER_ERROR = FALSE;    /* set in fix_press_clear () only */
    /* center the print head */
    put_ptr_str(CENTER_PRINT_HEAD);
}

/***************************************************************************
 *  NAME           : count_untrans_days
 *
 *  DESCRIPTION    : This routine will count the number of untransmitted days
 *                   and set the mach_lock flag if count is greater than
 *                   the max.
 *
 *  PARAMETERS
 *      none
 *
 *  RETURNS
 *      none
 *
 ***************************************************************************/
void count_untrans_days(void)
{
    int untrans_cnt;
    union doc *mid_sep_ptr;

/* if max days w/o poll set to zero, feature is disabled so return */
    if (!max_poll)
        return;

untrans_cnt = 0;
    mid_sep_ptr = marker;
    for(;;)
    {
        /* search for next separator record */
        get_next_doc(&mid_sep_ptr);
```

STD 617 PA — 50 —

```
06/10/1995 13:38      Filename: GENERAL.C                        Page 17

/* end of array? */
   if (mid_sep_ptr == marker)
     return;
 } while((mid_sep_ptr->REC_TYPE) != 4);

/* untransmitted day?? */
 if ((mid_sep_ptr->sepl_flag_type >= 0x80))
   if ((++untrans_cnt > max_poll) && max_poll))
   {
     mach_lock = TRUE;
     list_mach_lock('A');
     TIMEOUT = TRUE;
     return;
   }
 } /* End for ;; */
}

/*************************************************/
void reset_max(void)
{
  /* reset security values */
  max_items_cnt = 0;
  max_amount_cnt = 0L;
}
/*************************************************/
void list_mach_lock(char suffix)
{
  char tmp_str[21];

log_date();
  mach_suffix = suffix;     /* set global suffix */
  sprintf(tmp_str, "%s %c()377", MACHINE_LOCK_STR, mach_suffix);
  put_str(tmp_str, ccr, message_device);
  put_str(CALL_MONEY_ORDER_CO, message_device);
  linefeed(1, message_device);
}

/*************************************************
 *  NAME         :  press_clear
 *
 *  DESCRIPTION  :  This routine will display Press CLEAR message and
 *                  wait until the CLEAR key is pressed.
 *
 *  PARAMETERS
 *      char[]   -  message to display on top line
 *
 *  RETURNS
 *      none
 *
 *************************************************/
void press_clear (char top_line[])
{
  disable_cur();
  clr_dsply00(top_line);
```

```
06/10/1995 13:38      Filename: GENERAL.C                        Page 18 dsply_str10(Press_CLEAR_str);
  get_clear();
}

/*************************************************
 *  NAME         :  fix_press_clear
 *
 *  DESCRIPTION  :  This routine will display Fix and Press CLEAR
 *                  message and wait until the CLEAR key is pressed.
 *
 *  PARAMETERS
 *      char[]   -  message to display on top line
 *
 *  RETURNS
 *      none
 *
 *************************************************/
void fix_press_clear (char top_line[])
{
  PRINTER_ERROR = TRUE;  /* reset in reset_printer */ disable_cur();
  clr_dsply00(top_line);
  dsply_str10(Fix_Press_CLEAR_str);

/* reset even if error */
  unretract_doc ();

get_clear ();
}

/*************************************************
 *  NAME         :  get_clear
 *
 *  DESCRIPTION  :  This routine wait until the CLEAR key is pressed.
 *
 *  PARAMETERS
 *      none
 *
 *  RETURNS
 *
 *************************************************/
void get_clear ()
{
  byte key;

do
  {
    key = get_key();

/* if an event took place, return */
    if (!key)
      return;

} while (key != CLEAR);
}

/*************************************************/
void delay(int count_down)
{
  delay_cnt = count_down;
```

```
06/10/1995  13:38       Filename: GENERAL.C                                Page 12 while (delay_cnt)
  ;
}

/*********************************************************************
void nap_20(int timeout)
{
  TIMER1 = timeout;
  while ((TIMER1 > 0))
    ;
}

/*********************************************************************
** This function will allow the user to setup the following params for
** the lister output device:
**      Baud Rate (1200 - 9600)
**      Flow Control (Hard, Soft, None)
**      If Hard, BUSY control line (DSR, CTS)
**      End of Line character(s)
**
** Parameters:
**      direction      : used to allow entry from other menu structures, we can
**                       come in from the top or the bottom.
**
**      exit_at_top/bottom : also used by other master menus to control what
**                           should happen at the top/bottom of menu.
**                           Basically, this can turn off wrap-around.
*********************************************************************/
char setup_output(int direction, int exit_at_top, int exit_at_bottom)
{
  char rtn_val;
  int   i;
  byte  loc_byte_val;
  char  d_str[2];
  char  tmp_str[4];
  int   tmp_int;
  int   do_get_next, opt_direction;
  byte  loc_opt;

/* This allows us to traverse either forwards or backwards thru prompts
  ** to fit into other menus better. */
  if (direction == OPT_DOWN)
  {
    rtn_val = NEXT_OPTION;
    loc_opt = curr_opt = 1;
  }
  else
  {
    rtn_val = PREV_OPTION;
    loc_opt = curr_opt = 7;
  } for (;;)
  {
    do_get_next = TRUE;
    switch (loc_opt)
    {
      case ESCAPE :
        return(loc_opt);

case 0 : /* Wrap Around */
```

```
06/10/1995  13:38       Filename: GENERAL.C                                Page 20 if (exit_at_top)
          return(rtn_val);

loc_opt = 6;
        do_get_next = FALSE; /* Special Case */
        break;

case 1 : /* Get Report output device */
        rtn_val = sel_item(NUM_OF_RPT_DEV, &rpt_device, REPORT_DEVICE_STR, RP
T_DEV_MENU, 0x0001);

if (rpt_device == RPT_DEV_LISTER)
          lister_mode = VERBOSE;
        else
          prt_auto_rpt = NO;
        break;

case 2 : /* Get Message output device */
        rtn_val = sel_item(NUM_OF_RPT_DEV, &message_device, MESSAGE_DEVICE_ST
R, RPT_DEV_MENU, 0x0001);

if (message_device == RPT_DEV_LISTER)
          lister_mode = VERBOSE;
        break;

case 3 : /* Prompt for Baud rate */
        if (rpt_device == RPT_DEV_LISTER ||
            message_device == RPT_DEV_LISTER)
        {
          rtn_val = sel_item(NUM_OF_BAUDS_RS232, &lister_baud_index, "Select
Lister Baud", baud_rt_menu, 0x0001);
        }
        break;

case 4 : /* Setup  Flow Control (Hard, Soft, None) */
        if (rpt_device == RPT_DEV_LISTER ||
            message_device == RPT_DEV_LISTER)
        {
          rtn_val = sel_item(NUM_OF_FLOW_CONTROL, &flow_control_index, "List
er Flow Control", flow_control_menu, 0x0001);
        }
        break;

case 5 : /* If Hard, BUSY control line (DSR, CTS) */
        if (rpt_device == RPT_DEV_LISTER || message_device == RPT_DEV_LISTER
            && flow_control_index == FLOW_CONTROL_HARD)
        {
          rtn_val = sel_item(NUM_OF_FLOW_CONTROL_LINES,  &flow_control_line_i
ndex, "Flow Control Line", flow_control_lines_menu, 0x0001);
        }
        break;

case 6 : /* If Hard, how long to wait */
        if (rpt_device == RPT_DEV_LISTER || message_device == RPT_DEV_LISTER
```

STD 617 PA                                                          - 52 -

```
06/10/1995 13:38     Filename: GENERAL.C                              Page 21
                    flow_control_index == FLOW_CONTROL_HARD)
                 rtn_val = get_dsply_num(SCREEN_COLS, 3, 0x012F, lister_timeout_val
ue, LISTER_TIMEOUT_VALUE_STR);
             break;
         case 7: /* End of Line character(s) */
             if (rpt_device == RPT_DEV_LISTER ||
                 message_device == RPT_DEV_LISTER)
             {
                 rtn_val = sel_item(NUM_OF_LISTER_EOL, &lister_eol_index, "Lister E
nd-of-Line", lister_eol_menu, 0x00011);
                 /* Check if user defined */
                 if (lister_eol_index == LISTER_EOL_USER_DEFINED)
                 {
                     for (i = 0; i < SIZE_OF_LISTER_EOL_USER_DEFINED; i++)
                     {
                         /* Setup current char */
                         sprintf(tmp_str, "%d",
                             (int)lister_eol_choices[LISTER_EOL_USER_DEFINED][i]);
                         /* Setup prompt string */
                         sprintf(d_str, "Enter EOL %d of %d", i + 1, (int)(SIZE_OF_LI
STER_EOL_USER_DEFINED) - 1));
                         /* Get char */
                         if (get_dsply_num(SCREEN_COLS, 3, 0x012F, tmp_str, d_str) ==
 ESCAPE)
                             break;
                         else
                         {
                             /* Test for valid char */
                             tmp_int = atoi(tmp_str);
                             if (tmp_int > 255)
                             {
                                 press_clear("Must be <= 255");
                             }
                             else
                                 lister_eol_choices[LISTER_EOL_USER_DEFINED][i] = (byte
)tmp_int;
                             /* Note : increment i here if ok, otherwise user shoul
d
                             ** get prompted for same digit */
                             i++;
                             /*
                             ** if user terminates early by entering (0), then
                             ** we are done
                             */
                             if (tmp_int == 0)
                                 break;
                         } /* End of if valid char */
                     } /* End of if not user escaped */
                 } /* End for SIZE_OF_LISTER_USER_DEFINED */
```

```
06/10/1995 13:38     Filename: GENERAL.C                              Page 22
                 } /* End of if user defined */
                 strcpy(lister_eol_data, lister_eol_choices[lister_eol_index],
                     SIZE_OF_LISTER_EOL_USER_DEFINED - 1);
             }
             /* NOTE : should go with last case :
             ** As part of last option, if press enter then done, otherwise
             ** might be looping
             */
             if (rtn_val == ENTER)
                 return(ENTER);
             break;
         default: /* Wrap Around */
             if (exit_at_bottom)
                 return(rtn_val);
             loc_opt = 1;
             do_get_next = FALSE;  /* Special Case */
             break;
     } /* End of switch */
     /* Come back in synch with global curr_opt */
     curr_opt = loc_opt;
     if (do_get_next)
         get_next_opt(rtn_val, &opt_direction);
     loc_opt = curr_opt;
     if (TIMEOUT)
         return(rtn_val);
 } /* End for ; ; */
 return(rtn_val);
}

/***********************************************************************
void print_serno(byte pack, byte op_id, char format[], int index)
{
    calc_ser(pack, index, curr_ser);
    sprintf(print_line, format, (int)(SN_SIZE - 1), curr_ser, (int)op_id);
    put_str(print_line, message_device);
}

/*
**  NAME         :  doc_array_full
**
**  DESCRIPTION  :  Check if document array full.  Delete
**                  transmitted records and move marker if
**                  possible.
**
**  PARAMETERS
**      rec_no   :  pointer to position to check in doc array
**
**  RETURNS
**      1        :  if document array full
*/
```

STD 617 PA — 53 —

```
06/10/1995 13:38    Filename: GENERAL.C                    Page 22

:      :      otherwise
 :      :
 :      */
byte doc_array_full(union doc rec_ptr)
{
    doc_array_full_flg = FALSE;
    if ((rec_ptr == marker) && (marker == doc_rec)
        && (rec_ptr->REC_TYPE) == 0)
        return (0);                  /* First doc in cleared array */ if (rec_ptr < marker - 2 ||
       (rec_ptr > marker && (doc_rec + MAXDOCS) - rec_ptr
        + (marker - doc_rec) > 2))
        return(0);

/* removed the else.... jHK 3/20/91 */

/* Try to move marker */
    rec_ptr = marker;
    while ((rec_ptr->REC_TYPE) != 4)   /* Find next separator record */
    {
        get_next_doc(&rec_ptr);
        if (rec_ptr == marker)
        {                              /* Check for wrap around */
            doc_array_full_flg = TRUE; /* Array full */
            return(1);
        }
    } if (rec_ptr->TRANS_NOFEE)         /* if transmitted */
    {
        delete_day();                 /* Delete records */
        return(0);
    } doc_array_full_flg = TRUE;
    return(1);                        /* Can't move marker, array full */
}

/****************************************************************
 *
 *      NAME       :   advance_paper
 *
 *      DESCRIPTION
 *          This routine will advance the document n/216ths of an inch.
 *
 *      PARAMETERS
 *          int    :  n/216ths of an inch to advance the document.
 *
 *      RETURNS
 *          none
 *
 *      GLOBALS
 *          none
 *
 ****************************************************************/
void advance_paper(int line_cnt)
{
    while (line_cnt > 255)
    {
        put_ptr_str (FORWARD_FEED);
        put_ptr_char (255);
        line_cnt -= 255;
    }
```

```
06/10/1995 13:38    Filename: GENERAL.C                    Page 23 put_ptr_str (FORWARD_FEED);
    put_ptr_char ((byte)line_cnt);
}

/****************************************************************
 *
 *      NAME       :   retract_doc
 *
 *      DESCRIPTION
 *          This routine will retract the document to a secure position
 *          if not already there.
 *
 ****************************************************************/
void retract_doc(void)
{
    if (!doc_retracted)
    {
        put_ptr_str (RETRACT_IT);
        doc_retracted = TRUE;
    }
}

/****************************************************************
 *
 *      NAME       :   unretract_doc
 *
 *      DESCRIPTION
 *          This routine will return the top of the document to the
 *          tear bar if not already there.
 *
 ****************************************************************/
void unretract_doc(void)
{
    if (doc_retracted)
    {
        put_ptr_str (ADVANCE_IT);
        doc_retracted = FALSE;
    }
}

/****************************************************************/
void ptr_set_17cpi(void)
{
    put_ptr_str (pitch_ptr [2]);      /* 17 CPI */
    put_ptr_str (SET_LEFT_MARGIN);
}

/****************************************************************/
void center_it(void)
{
    ptr_set_17cpi ();
    put_ptr_char ((byte)27);
    put_ptr_char ((.));
}

/****************************************************************
 *
 *      NAME       :   get_next_opt
 *
 *      DESCRIPTION
 *          Increment/decrement option position according to key stroke.
 *
 *      PARAMETERS
```

STD 617 PA                                                           - 54 -

```
06/10/1995 13:38        Filename: GENERAL.C                    Page 25

**        char    *inkey    (the key)
 **
 **      RETURNS
 **        none
 **
****************************************************************/
void get_next_opt(char inkey, int *direction)
{
   if (inkey == ENTER) || (inkey == NEXT_OPTION))
   {
      curr_opt++;
      *direction = OPT_DOWN;
   }
   else
   if (inkey == PREV_OPTION)
   {
      curr_opt--;
      *direction = OPT_UP;
   }
   else
   if (inkey == ESCAPE || inkey == 0)
      curr_opt = ESCAPE;
}

/****************************************************************
 **
 ** dsply_time_date()
 **
 **   Display the time and date (blinking :) on the bottom line of the
 **   display.
 **
****************************************************************/
void dsply_time_date(void)
{
   char d_str[20];
   char tmp_str[2];

if (time_change)
   {
      time_change = FALSE;
      sprintf(d_str, " %02d/%02d/%02d %2d:%02d %s ",
              (int)MONTH, (int)DOM, (int)YEAR,
              (int)(HRS & 0x7F), (int)MINS,
              (HRS > 12) ? "PM" : "AM");

dsply_str10(d_str);
   }
   if (blink_change)
   {
      blink_change = FALSE;
      if (!blink_state)
      {
         tmp_str[0] = ':';
         blink_state = 1;
      }
      else
      {
         tmp_str[0] = ' ';
         blink_state = 0;
      }
      tmp_str[1] = NULL;
      dsply_str1(13, tmp_str);
```

```
06/10/1995 13:38        Filename: GENERAL.C                    Page 26

}
}
/****************************************************************
 *  print the appropriate lister message   */
 /* REMEMBER - exec keys are active low */
void exec_entry_audit(int direction, byte which_exec)
{
   log_date();
   sprintf(print_line, EXEC_ENTRY_SPR,
           which_exec == HIGH_SWITCH ? "High" : "Low",
           direction == ENTERING_EXEC ? "Entry" : "Exit");
   put_str(print_line, message_device);
   linefeed(1, message_device);
}

/************************* END OF GENERAL.C *******************/
```

```
02/16/1995 10:35    Filename: EXECPROC.C                                                    Page   1
/*****************************************************************************
 *
 *  execproc.c
 *
 *****************************************************************************/ include "const.h"
include "constdat.h"
#include "struct.h"
#include "8012.h"
#include "io.h"
#include "data.h"
#include "proto.h"

#include <stdio.h>
#include <string.h>
include <stdlib.h>

/* File scoped vars */
int opt_cnt, opt_ptr;
char opt_key;
char opt_str[3];

/* WARNING : Leave this varibles up here ....
** They are only used for check_exec() but since it can
** call functions via function pointers, the Franklin
** compile doesn't understand. So .... during optimization
** it will most likely assign one of the other "stack"
** variable for the called routines to the same space.
*/

/*****************************************************************************
 *
 *  NAME          :  check_exec
 *
 *  WRITTEN BY    :  J. H. King
 *
 *  DESCRIPTION   :
 *    This routine will accept and validate an executive passcode.
 *    This routine also contains the exec menu loop and will jump
 *    to the corresponding exec routine in the exec opt. table
 *    upon the selection of an option.
 *
 *  PARAMETERS
 *    none
 *
 *  RETURNS
 *    none (void)
 *
 *****************************************************************************/
void check_exec(void)
{
  byte inkey;

pc_lockout = FALSE;        /* reset opr pc  lockout flag after exec entry */
  cur_op_tries = 0;          /* reset retry count */

HI_KEY_SET = FALSE;
  if (is_SPECIAL_FUNCTION(MIDAMER))     /* reset high exec key switch flag */
    hi_exec_key_access = DISABLED;

/***************************************
  ** WARNING WARNING WARNING WARNING
  ** DANGER DANGER DANGER DANGER DANGER
```

```
02/16/1995 10:35    Filename: EXECPROC.C                              Page 1

** This routine uses some strange logic to maintain
** the menu structure of ...
** options 1 <-> Setup
**   If press ENTER on Setup, then go into (Setup + 1) <-> Last Option
**   If press ESC from (Setup + 1) <-> Last Option, then go to Setup
**   If press ESC from Setup, then go to first option.
**
** Make changes AT YOUR OWN RISK !!!
**
***************************************************/
current_pos = 5;
get_option(FORWARD);           /* get 1st available opt */

/* if there are no options available then report and return */
if (current_pos == 100)
{
    clr_dsply0(No_Options_Available);
    if (EXEC_BUTTON)
        while ((TIMEOUT && !HI_EXEC_BUTTON && (inkey != ESCAPE))
        {
            inkey = get_key();
            if ((inkey == EXEC) && exec_key_access >= 2)
                HI_EXEC_BUTTON = TRUE;

if ((inkey == ESCAPE) && exec_key_access != 2)
                exec_key_access = 0;
        }
        EXEC_BUTTON = FALSE;
    }
    else
    {
        while (!EXIT_EXEC && !HI_EXEC_BUTTON)
        {
            if ((get_key() == EXEC) && (exec_key_access >= 2))
                HI_EXEC_BUTTON = TRUE;
        }
        if (EXIT_EXEC && (exec_key_access == 1))
            exec_key_access = 0;
    }
    return;
}

/*
** Process select executive option until an exit (escape) is
** received.
*/
for (;;)
{
    if (EXIT_EXEC)
        return;
    if (TIMEOUT)
    {
        EXEC_BUTTON = FALSE;
        exec_key_access = 0;
        return;
    }

/* Display choice */
    clr_dsply0(select_option);
    clr_dsply_str10(exec(current_pos).dsply_opt);

/** Remember: The last parameter in get_dsply_num must be a
     ** pointer to a null string so that the top line does not
```

```
02/16/1995 10:35    Filename: EXECPROC.C                              Page 4

** get written over...         */

/* Special - for non-numeric selection - like Setup */
    if ((int)(exec(current_pos).opt_num) == HIDDEN_MENU)
        opt_str[0] = '\0';
    else
        sprintf(opt_str, "%2d", (int)(exec(current_pos).opt_num));

/* Valid keys: Prev/Next Option, Esc, Enter, Clear, Numeric */
    opt_key = get_dsply_num(SCREEN_COLS, 2, 0x403F, opt_str, "");
    if (EXIT_EXEC)
        return;

if (TIMEOUT)
    {
        exec_key_access = 0;
        EXEC_BUTTON = FALSE;
        return;
    } switch (opt_key)
    {
        case ENTER:
            opt_ptr = atoi(opt_str);

/* Special - for non-numeric selection - like Setup */
            if (opt_str[0] == '\0')
            {
                current_pos = SETUP_MENU;   /* Set to first setup */

/* If we don't have access to first setup, then find the
                ** one we do. */
                if (EXECMODE == LOW && !low_flg(current_pos))
                    get_option(FORWARD);
            }
            else
            {
                /* validate the entered option */
                for (opt_cnt = 0; opt_cnt < MAXOPTS; opt_cnt++)
                {
                    if (opt_ptr == (int)exec(opt_cnt).opt_num)
                    {
                        if ((EXECMODE == HIGH ||
                            (opt_ptr != HIDDEN_MENU && EXECMODE == LOW && low_f
                        {
                            current_pos = opt_cnt;  /* Set the new cursor pos */
                            (func(current_pos).routine)();
                            if (EXIT_EXEC)
                            {
                                if ((exec_key_access & 1) && (EXECMODE == LOW)
                                    exec_key_access = 0;
                                BUTTON_SET = FALSE;
                                return;
                            }
                        }
                    }
                }
            }
            if (BUTTON_SET)
```

STD 617 PA                                                          - 57 -

```
02/16/1995 10:35      Filename: EXECPROC.C                          Page 5 if (TIMEOUT)
            {
                EXEC_BUTTON = FALSE;
                if (!BUTTON_SET)
                    exec_key_access = 0;
                BUTTON_SET = FALSE;
                return;
            }
            break;

}  /* End for */ if (opt_cnt >= MAXOPTS)
            prs_clr_invld_opt_no ();

if (EXIT_EXEC && !EXEC_BUTTON)
        {
            if ((exec_key_access == 1) && (EXECMODE == LOW)
                && !BUTTON_SET)
                exec_key_access = 0;
            BUTTON_SET = FALSE;
            return;
        } if (TIMEOUT)
        {
            EXEC_BUTTON = FALSE;
            if (!BUTTON_SET)
                exec_key_access = 0;
            BUTTON_SET = FALSE;
            return;
        }

}  /* End if not setup */
    break;

case ESCAPE:
    /* Note: " .... there is no escape" - well not from the exec
    ** options anyway. */

/* Special - for non-numeric selection - like setup */
    if (current_pos > (SETUP_MENU - 1))
        current_pos = (SETUP_MENU - 1);  /* Set the new cursor pos. */
    else
    {
        if (EXEC_BUTTON || HI_EXEC_BUTTON)
        {
            EXEC_BUTTON = FALSE;
            if (((exec_key_access & 1) || HI_EXEC_BUTTON)
                && !BUTTON_SET)
                exec_key_access = 0;
            BUTTON_SET = FALSE;
```

```
02/16/1995 10:35      Filename: EXECPROC.C                          Page 6 return;
            }
            current_pos = 5;
            get_option(FORWARD);  /* get 1st available opt */
        }
        break;

case EXEC:
        if ((EXECMODE == LOW) && HI_EXEC_BUTTON)
            return;

case PREV_OPTION:
        get_option(BACKWARD);
        break;

case NEXT_OPTION:
        get_option(FORWARD);
        break;

}  /* End of switch */

}  /* end of for loop */

/*******************************************************************
*
*   NAME              :   get_option
*
*   WRITTEN BY        :   J. H. Ming
*
*   DESCRIPTION
*      This routine will return an index to the next or prior
*      valid executive option.
*
*   PARAMETERS
*      none
*
*   RETURNS
*      byte   -   current index of next/prior option
*                 (returns a 100 if option not found)
*
*******************************************************************/
void get_option (int direction)
{
    byte   opt_cnt = 0;

while (++opt_cnt <= MAXOPTS)
    {
        if (direction == FORWARD)
        {
            ++current_pos;

/* If going forward then check for wrap around */
            /* Options 1 - 5 */
            if (current_pos == 6)
            {
                /* if opts 1-5 not available, remain at 6 */
                if ((opt_cnt != 6) || low_flg[0])
                    current_pos = 0;  /* wrap around */
            }

/* Options 20 - 14 wraparound back to 20 */
            if (current_pos == MAXOPTS)
```

```
                    current_pos = 6;
        }
        else
        {
            /* If going backward the check for wrap around */
            if (current_pos == 0)
                current_pos = 5;
            else
            {
                /* If next display is setup then backup to opt. 5 */
                if (--current_pos == 5)
                    current_pos = MAXOPTS - 1;
            }
        }

/* If high level exec or low level and option enabled then valid */
        if (EXECMODS == 2 || low_flg[current_pos])
            return;

/* If options 1 - 5 not available then skip to 20 - 31 */
        if ((current_pos == 4) && (opt_cnt == 5))
            current_pos = 5;
    }

/* Return an error indicating that
    ** a valid option was not found */
    current_pos = 100;
}

/**********************************************************************/
void prs_clr_invld_opt_no(void)
{
    press_clear (Invalid_option_No);
}
/************************* END OF EXECPROC.C *************************/
```

STD 617 PA                                              - 59 -

```
04/04/1995  11:09     Filename: OPT20_25.C                                    Page 1
/********************************************************************
*
* opt20_25.c -
*
********************************************************************

04/04/1995  11:09     Filename: OPT20_25.C                                    Page 2 include "const.h"
include "constdat.h"
#include "struct.h"
#include "data.h"
#include "8032.h"
#include "proto.h"
#include <stdio.h>
#include <stdlib.h>
#include <string.h>
#include <ctype.h>

/*********************************************************************
*
*   NAME               exec_opt_20
*
*   WRITTEN BY         J H King
*
*   DESCRIPTION        Process executive option 20
*
*   PARAMETERS
*        none
*
*   RETURNS
*        none
*
**********************************************************************/
void exec_opt_20(void)
{
    char inkey;
    int  opc_pos;
    int  i, str_cnt;
    char tries_str[3], numeric_str[3];
    int  do_get_next;
    byte loc_opt;
    int  exit_loop, opt_direction, editing;
    char rtn_val, d_str[21];

/* Because some enter routines update curr_opt and some don't...
    ** I will bypass them and use get_next_opt */
    loc_opt = curr_opt = 1;
    opc_pos = 0;
    str_cnt = 0;

for ( ; ; )
    {
        /*
        ** Note : Many of these selections are only available
```

STD 617 PA                                     - 60 -

```
** under certain configurations.  The method used here is to
** keep rtn_val and calculate next option.  each option is
** responsible for knowing if it should be executed, if not it
** simply falls thru to use the last rtn_val again. So if NEXT is
** is pressed but the next option is not allowed, then the loop
** does another NEXT until one is found.
**
** THEREFORE, THE ORDER OF THESE CASES IS SOMEWHAT IMPORTANT.
*/ do_get_next = TRUE;
editing = TRUE;

switch(loc_opt)
{
    case ESCAPE:
        return;

case 0 :  /* Wrap Around */
        loc_opt = 3;
        do_get_next = FALSE;  /* Special Case */

/* For wrapping, start at last OPERATOR */
        opc_pos = MAXOPERS - 1;
        break;

case 1 :  /* Is a passcode required? */
        rtn_val = select_0_1 (op_passcd_req, YES_NO, Passcode_Required);

/* If passcodes are not required, then we're done */
        if (!op_passcd_req)
            return;
        break;

case 2 :  /* Get number of tries */
        sprintf(tries_str, OPT8_SPR2, (int)op_tries);
        rtn_val = get_deply_num(SCREEN_COLS, 2, 0x012F, tries_str, ENTER_NO_
OF_TRIES);

if (rtn_val == ENTER)
            op_tries = (byte) atoi(tries_str);
        break;

case 3 :  /* Get operator ID / Passcodes */
        exit_loop = FALSE;
        while (!exit_loop)
        {
            /* Get the passcode for each operator */
            cli_deplyout(ID_PASSCODE);

sprintf(id_str, exec_opt_20_1,
                editing ? EDITING_SYMBOL : NOT_EDITING_SYMBOL,
                opc_pos + 1);
            clr_deply_str(d_str);

/* Check if entered a valid op ID */
            if ((opc_pos >= 0) && (opc_pos < MAXOPERS))
                deply_str(SCREEN_COLS - strlen(op_pc_tab[opc_pos].passcode), c
p_pc_tab[opc_pos].passcode);

inkey = get_key();
```

```
            if (!inkey)
                return;

/****************************************
            ** If we have a "number" key pressed,
            ** then add it to the data
            ****************************************/
            if (isdigit(inkey))
            {
                if (str_cnt == 0)
                {
                    numeric_str[0] = inkey;   /* Add input to string */
                    numeric_str[1] = '\0';
                    str_cnt++;
                }
                else
                {
                    numeric_str[1] = inkey;   /* Add input to string */
                    numeric_str[2] = '\0';
                    str_cnt = 2;
                }
                opc_pos = atoi(numeric_str) - 1;
            } /* End of if a digit */
            else
            {
                /* Since a digit wasn't pressed, then we have changed the
                ** ID by some other means, NEXT / PREV ... so need to
                ** reset str_cnt to work properly. */
                str_cnt = 0;

switch (inkey)
                {
                    case ESCAPE:
                        return;

case NEXT_OPTION:
                        opc_pos++;

/* For these, do not wrap around */
                        if (opc_pos >= MAXOPERS)
                        {
                            rtn_val = inkey;
                            exit_loop = TRUE;
                        }
                        break;

case PREV_OPTION:
                        opc_pos--;

/* For these, do not wrap around */
                        if (opc_pos < 0)
                        {
                            rtn_val = inkey;
                            opc_pos = 0;
                            exit_loop = TRUE;
                        }
                        break;
```

```
STD 617 PA                                                             - 61 -

04/04/1995 11:09    Filename: OPT20_25.C                              Page 5 case ENTER:

/* Check if entered a valid OP ID */
            if (opc_pos < 0 || (opc_pos >= MAXOPERS))
            {
                press_clear(Invalid_Operator_ID);
                /* If a timeout occurred then exit... */
                if (EXIT_EXEC)
                    return;

opc_pos = 0;
            }
            else
            {
                /* Good ID, so we can get Passcode */

/* First, get rid of '*' by ID, since we are now
                ** editing the passcode */
                dsply_str(0, " ");

/* Valid keys: Enter, Esc, Clear, numerics */
                /* Don't write over bottom line of display */
                inkey = get_dsply_num(SCREEN_CCLS, 10, 0x43F, op_pc_tab[
opc_pos].passcode, "");

/* If a timeout occurred then exit... */
                if (EXIT_EXEC)
                    return;

/* If a passcode is entered then check for a duplicate... */
                if (inkey == ENTER)
                {
                    if (op_pc_tab[opc_pos].passcode[0] != '\0')
                    {
                        for (i = 0; i < MAXOPERS; i++)
                        {
                            /* Don't compare current ID */
                            if (i == opc_pos)
                                continue;

if (strcmp(op_pc_tab[i].passcode, op_pc_tab[opc_
pool].passcode) == 0)
                            {
                                /* Reset passcode, display dup. message */
                                op_pc_tab[opc_pos].passcode[0] = '\0';
                                sprintf(io_tmp_str, exec_opt_20_2, i+1);
                                press_clear(io_tmp_str);

/* If a timeout occurred then exit... */
                                if (EXIT_EXEC)
                                    return;

break;

} /* End for opers testing for dups */
                        }

/* If enter a valid passcode, then clear out any fl
ag value */
                        if (i == MAXOPERS)
                            op_pc_tab[opc_pos].flag = 0;

/* NOTE : should go with last case */
                        /* ** As part of last option, if press enter then done
                        , otherwise 04/04/1995 11:09    Filename: OPT20_25.C                              Page 6

** might be looping
                        */
                        if (opc_pos == MAXOPERS)
                            return;

else
                        {
                            /* Pressed ENTER on cleared    so make sure flag is
cleared */
                            op_pc_tab[opc_pos].flag = 0;
                        }

} /* End of ENTER key */

} /* End of if valid op id */ break;

/* End of switch on inkey */

/* If a timeout occurred or user configured no passcodes then exit.. */
            if (EXIT_EXEC || TIMEOUT)
                return;

} /* End while */ break;

default :  /* Wrap Around */
            loc_opt = -1;
            do_get_next = FALSE;  /* Special Case */
            /* For wrapping, start at last OPERATOR */
            opc_pos = 0;

break;

} /* End if switch on menu */

/* If a timeout occurred or user configured no passcodes then exit... */
    if (EXIT_EXEC || TIMEOUT)
        return;

/* Come back in sync with global curr_opt */
    curr_opt = loc_opt;
    if (do_get_next)
    {
        get_next_opt(rtn_val, &opt_direction);
        loc_opt = curr_opt;
    }

} /* End for */

} /* End of opt_20 */

/***********************************************************************
**
**  NAME             exec_opt_21
**
**  DESCRIPTION
**      Configure high and low level executive
**
***********************************************************************/
void exec_opt_21(void)
```

```
04/04/1995  11:03      Filename: OPT20_25.C                                Page byte i;
  int opt_pos;       /* Used to point to the menu item being configured */
  int menu_number;   /* This is the displayed/entered menu number - like 01 for
'Print Reports' */
  int editing = FALSE;
  byte access_value, loc_key_access;
  char numeric_str[3];
  int do_get_next, str_cnt;
  byte loc_opt;
  int exit_loop, opt_direction;
  char rtn_val;

/* Because some enter routines update curr_opt and some don't..
  ** I will bypass them and use get_next_opt */
  loc_opt = curr_opt = i;
  opt_pos = 0;
  menu_number = (int)exec[opt_pos].opt_num;
  sprintf(numeric_str, "%2d", menu_number);
  str_cnt = 0;

for ( ; ; )
  {
    /*
    ** Note: Many of these selections are only available
    ** under certain configurations. The method used here is to
    ** keep rtn_val and calculate next option, each option is
    ** responsible for knowing if it should be executed, if not it
    ** simply falls thru to use the last rtn_val again. So if NEXT is
    ** is pressed but the next option is not allowed, then the loop
    ** does another NEXT until one is found.
    **
    ** THEREFORE, THE ORDER OF THESE CASES IS SOMEWHAT IMPORTANT.
    */
    do_get_next = TRUE;
    editing = FALSE;
    switch(loc_opt)
    {
      case ESCAPE:
        return;

case 0:    /* Wrap Around */
        loc_opt = 4;
        do_get_next = FALSE;      /* Special Case */

/* For wrapping, start at last OPERATOR */
        opt_pos = (MAXOPTS - 1);
        menu_number = (int)exec[opt_pos].opt_num;
        sprintf(numeric_str, "%2d", menu_number);
        str_cnt = 0;

break;

case 1:    /* Enable/Disable the HIGH level executive key switch ... */
        access_value = hi_exec_key_access;

/* If we can't get to first option, then must pre-set rtn_val
        ** for processing keys. So set it to something appropriate */
        rtn_val = NEXT_OPTION;
        if ((EXECMODE == 2) && is_SPECIAL_FUNCTION(MIDAMBR))
#ifdef JKING
#else
```

```
04/04/1995  11:09      Filename: OPT20_25.C                                Page endif
        if (is_SPECIAL_FUNCTION(MIDAMBR))
           hi_exec_key_access = DISABLED;

HI_KEY_SET = TRUE;                /* set whether enabled or not */
        rtn_val = select_0_1(&access_value, ENABLR_MENU, High_Level_Exec_Key);

/* Make sure we don't lock ourselves out ...
        ** Can only disable HI Key if ...
        ** Comm != NONE (that is one way of resetting)
        **     OR
        ** LO Key is enabled and have access to option 21
        */
        if (access_value == DISABLED && access_value != hi_exec_key_access
        {
           if (comm_mode != NONE ||
               (lo_exec_key_access == ENABLED && low_flg[7]))
           {
              hi_exec_key_access = access_value;
           }
           else
           {
              press_clear(LAST_CANT_CHANGE);
              rtn_val = CLEAR;
           }
        }
        else
           hi_exec_key_access = access_value;

break;

case 2:  /* Enable/Disable the LOW level executive key switch ... */
        access_value = lo_exec_key_access;

if (EXECMODE == 2 || (EXECMODE == 1 && low_flg[7]))
        {
           rtn_val = select_0_1(&access_value, ENABLE_MENU, Low_Level_Exec_Ke /* Make sure we don't lock ourselves out ...
           ** Can only disable LO Key if ...
           ** Comm != NONE (that is one way of resetting)
           **     OR
           ** HI Key is enabled
           */
           if (access_value == DISABLED &&
               access_value != lo_exec_key_access)
           {
              if (comm_mode != NONE ||
                  (hi_exec_key_access == ENABLED))
              {
                 lo_exec_key_access = access_value;
              }
              else
                 press_clear(LAST_CANT_CHANGE);
```

STD 617 PA                                                          - 63 -

```c
            ** then add it to the data
            ****************************************/
            if (!editing && isdigit(rtn_val))
            {
                if (str_cnt == 0)
                {
                    numeric_str[0] = rtn_val;  /* Add input to string */
                    numeric_str[1] = '\0';
                    str_cnt++;
                }
                else
                {
                    numeric_str[1] = rtn_val;  /* Add input to string */
                    numeric_str[2] = '\0';
                    str_cnt = 0;

/* If we have 2 digits, then setup menu number to
                    ** go back to top of loop and get that menu */
                    menu_number = atoi(numeric_str);
                }
            }  /* End of if a digit */ switch (rtn_val)
            {
                case ESCAPE :
                    if (!editing)
                        return;
                    else
                        editing = FALSE;
                    break;

case NEXT_OPTION :
                    /* If we are not editing the ON/OFF status, then
                    ** arrow keys will scroll thru menu items. */
                    if (!editing)
                    {
                        ++opt_pos;
                        if (opt_pos == (SETUP_MENU - 1))
                            ++opt_pos;

/* No wrap around here - that is done at the
                        ** other looping level */
                        if (opt_pos == MAXOPTS)
                        {
                            opt_pos = MAXOPTS - 1;
                            exit_loop = TRUE;
                        } menu_number = (int)exec(opt_pos).opt_num;
                    }
                    else  /* We must be editing the OFF/ON */
```

```c
                rtn_val = CLEAR;
            }
            else
                lo_exec_key_access = access_value;

break;

case 3 :  /* Setup LOW level executive rights ... */
        /* Only high can setup low */
        if (EXECMODE == 2 && lo_exec_key_access)
        {
            exit_loop = FALSE;
            while (!exit_loop)
            {
                if (!find_menu(&menu_number, &opt_pos) == FALSE)
                {
                    prs_clr_invld_opt_no();

if (EXIT_EXEC)
                        return;

/* If we failed, opt_pos will be reset to start, so
                    ** go back to top of loop and get that menu */
                    sprintf(numeric_str, "%2d", menu_number);
                    continue;
                }

/* If we aren't editing the OFF/ON, then we can reset
                ** this, otherwise it is set by using NEXT/PREV. */
                if (!editing)
                    access_value = low_flg(opt_pos);

/* Display Screen */
                clr_dsply00(exec(opt_pos).dsply_opt);

/* Since we are either editing menu number or OFF/ON
                ** we can use the same variable (editing) to know the
                ** current state. */
                sprintf(io_tmp_str, CONFIGURE_EXEC_SPR,
                    (editing ? EDITING_SYMBOL : NOT_EDITING_SYMBOL),
                    numeric_str,
                    editing ? EDITING_SYMBOL : NOT_EDITING_SYMBOL,
                    OFF_ON(access_value));

dsply_strl0(io_tmp_str);

/*
                ** Process KEYS
                */
                rtn_val = (char)get_key();
                if (!rtn_val)
                    return;

/***************************************
                ** If we have a "number" key pressed,
```

```
Filename: OPT20_25.C                                      Page 11 if (access_value == (byte)0)
            access_value = (byte)1;
        else
            access_value = (byte)0;
    }
    break;

case PREV_OPTION:
    /* if we are not editing the ON/OFF status, then
    ** arrow keys will scroll thru menu items. */
    if (!editing)
    {
        --opt_pos;

/* No wrap around here  that is done at the
        ** other looping level.  */
        if (opt_pos < 0)
        {
            exit_loop = TRUE;
            opt_pos = 0;
        }

/* skip setup (if appropriate position) */
        /* if configure exec then skip */
        if (opt_pos == (SETUP_MENU - 1))
            --opt_pos;

menu_number = (int)exec[opt_pos].opt_num;
    }
    else
    {
        /* We must be editing the OFF/ON */
        if (access_value == (byte)0)
            access_value = (byte)1;
        else
            access_value = (byte)0;
    }
    break;

case ENTER:
    if (!editing)
    {
        /* Set menu to user keyed (if any) */
        menu_number = atoi(numeric_str);
        sprintf(numeric_str, "%2d", menu_number);
        if (find_menu(&menu_number, &opt_pos) == TRUE)
        {
            editing = TRUE;
            access_value = low_fig[opt_pos];
        }
        else
        {
            /* Force error message */
            menu_number = 100;
```

```
Filename: OPT20_25.C                                      Page 12

/* clean out user entered string for next pass */
        str_cnt = 0;
    }
    else
    {
        /* User is setting access, so do verifications
        ** and post processing - like possible call
        ** select flag to setup any sub menus */
        editing = FALSE;

/* SPECIAL PROCESSING */

/* Make sure we don't lock ourselves out
        ** Can only disable Low Exec - Config Exec is if
        ** Comm != NONE (that is one way of resetting)
        ** OR
        ** Hi Key is enabled
        */
        if ((opt_pos == 7) && (access_value == OFF) &&
            (low_fig[opt_pos] != access_value))
        {
            if ((comm_mode != NONE ||
                (hi_exec_key_access == ENABLED))
            {
                low_fig[opt_pos] = access_value;
            }
            else
            {
                press_clear(LAST_CANT_CHANGE);
                rtn_val = CLEAR;
            }
        }
        else
            low_fig[opt_pos] = access_value;

low_fig[SETUP_MENU - 1] = NO; /* reset the setup fla  g */

/* If any of options 20-31 are set, enable setup menu */
        for (i = MAXOPT_MINUS_1; i > 5; --i)
        {
            if (i == low_fig[i])
                low_fig[SETUP_MENU - 1] = YES; /* Enable setup menu */
        }

/* Break down for option 1 (reports) */
        if ((int)exec[opt_pos].opt_num == PRINT_REPORTS_MENU &
            low_fig[opt_pos])
        {
            select_flag(Print_Reports_01,
                (byte)5, opt1_fig, report_menu);

/* If any of sub options for 1 are set, enable Repo   rts menu */
            low_fig[opt_pos] = NO; /* Reset Reports menu */
            for (i = 0; i < 6; i++)
            {
                if (opt1_fig[i])
                    low_fig[opt_pos] = YES; /* Enable setup menu */
```

STD 617 PA                                                          - 65 -

```
04/04/1995 11:09          Filename: OPT20.25.C                      Page 13          04/04/1995 11:09         Filename: OPT20.25.C                        Page 14

}                                                                           if (loc_key_access == exec_key_access)
                    /* Break down for option 32 (fee tables/commission) */                          BUTTON_SET = TRUE;
                    if ((int)exec[opt_pos].opt_num == SETUP_FEE_TABLE_MENU                      break;
                        || low_fig[opt_pos])
                    {                                                                       default :   /* Wrap Around */
                        select_flag(Setup_Fee_Table_32,                                         loc_opt = 1;
                            (byte), opt32_fig, opt32_menu);                                     do_get_next = FALSE;   /* Special Case */
                                                                                                /* For wrapping, start at last OPERATOR */
                        /* If any of sub options for 32 are set, enable fee                     opt_pos = 0;
Table menu */                                                                                   menu_number = (int)exec[opt_pos].opt_num;
                        low_fig[opt_pos] = NO;  /* Reset Fee Table menu */                      sprintf(numeric_str, "%2d", menu_number);
                        for (i = 0; i < 2; i++)                                                 str_cnt = 0;
                        {                                                                       break;
                            if (opt32_fig[i])
                                low_fig[opt_pos] = YES;  /* Enable setup menu       }   /* End if switch on menu */

}                                                           /* If a timeout occurred or user configured no passcodes then exit */
                                                                                    if (EXIT_EXEC || TIMEOUT)
                                                                                        return;
                        break;
                    }   /* End of switch on rtn_val */                              /* Come back in synch with global curr_opt */
                                                                                    curr_opt = loc_opt;
                    /* If a timeout occurred or user configured no passcodes then   if (do_get_next)
it....*/                                                                            {
                    if (EXIT_EXEC || TIMEOUT)                                           get_next_option(rtn_val, &opt_direction);
                        return;                                                         loc_opt = curr_opt;
                                                                                    }
                    if (!isdigit(rtn_val) && rtn_val != ENTER)
                    {                                                           }   /* End for ;; */
                        /* Since a digit wasn't pressed, then we have changed the
                        ** ID by some other means, NEXT / PREV ... so need to       /***********************************************************
                        ** reset str_cnt to work properly. */                       ** NOTE : These are special because they take arrays of ptr's to char that
                        str_cnt = 0;                                                ** we have declared code space, to work without warnings, proto's need
                        sprintf(numeric_str, "%2d", menu_number);                   ** keyword "code" as part of type.
                    }                                                               ***********************************************************/
                                                                                    void select_flag(char *top_ln, byte of_max_items, byte *item_flag, char code *item
                    rtn_val = NEXT_OPTION;                                          m_menu())
                                                                                    {
                    if (EXECMODE == 2)                                                  byte inkey;
                        i = 4;                                                          int  editing = FALSE;
                    else                                                                int  menu_pos = 0;
                        break;                                                          int  exit_menu = FALSE;
                                                                                        byte menu_byte;
                    loc_key_access = exec_key_access;                                   char d_str[21];
                    rtn_val = sel_item(i, &exec_key_access, Exec_Keypad_Str, EXEC_KEY_ACC
ESS_MENU, 0x0001);                                                                      /* Display choice */
                                                                                        dsply_str0(top_ln);

menu_byte = item_flag[menu_pos];

while (!exit_menu)
                                                                                        {
                                                                                            /* If we aren't editing OFF/ON, then we MUST be editing the
                                                                                            ** menu selection, so put a '*' in front of it. */
                                                                                            sprintf(d_str, "%4s",
                                                                                                editing ? EDITING_SYMBOL : NOT_EDITING_SYMBOL,
                                                                                                item_menu[menu_pos]);
                                                                                            clr_dsply_str10(d_str);

/* To signify editing, place '*' ahead of string */
```

STD 617 PA                                                    - 66 -

```
                    if (editing)
                        dsply_stro(16, EDITING_SYMBOL);
                    else
                        dsply_stro(16, " ");

dsply_stro(17, OFF_ON[menu_byte]);

inkey = get_key();
                    if (!inkey)
                        return;

switch (inkey)
                    {
                        case ENTER :
                            if (!editing)
                            {
                                editing = TRUE;
                            }
                            else
                            {
                                item_flag[menu_pos] = menu_byte;
                                editing = FALSE;

/* If press ENTER on last option then leave */
                                if (menu_pos == sf_max_items)
                                    exit_menu = TRUE;
                            }
                            break;

case ESCAPE:
                            if (editing)
                            {
                                editing = FALSE;
                                menu_byte = item_flag[menu_pool];
                            }
                            else
                                exit_menu = TRUE;
                            break;

case PREV_OPTION :
                            if (editing)
                            {
                                menu_byte = --menu_byte;
                            }
                            else
                            {
                                if (!menu_pos)
                                    --menu_pos;
                                else
                                {
                                    /* Do wrap around */
                                    menu_pos = sf_max_items;
                                } menu_byte = item_flag[menu_pool];
                            }
                            break;

case NEXT_OPTION:
                            if (editing)
                            {
                                menu_byte = ++menu_byte;
                            }
                            else
                            {
                                /* Do wrap around */
                                if (++menu_pos > sf_max_items)
                                    menu_pos = 0;

menu_byte = item_flag[menu_pos];
                            }
                            break;
                    } /* End of switch */

/* If a timeout occurred or user configured no passcodes then exit */
                    if (EXIT_EXEC || TIMEOUT)
                        return;

} /* End of for */
}

/****************************************************************************
 *
 *    NAME              :  exec_opt_23
 *
 *    WRITTEN BY        :  J. H. King
 *
 *    DESCRIPTION       :  Process executive option 23 - Set Timeouts.
 *
 *    PARAMETERS
 *        none
 *
 *    RETURNS
 *        none
 *
 ****************************************************************************/
void exec_opt_23(void)
{
    char rtn_val;
    byte loc_opt;
    int  opt_direction, do_get_next;
    byte loc_byte;

/* Because some enter routines update curr_opt and some don't
    ** I will bypass them and use get_next_opt */
    loc_opt = curr_opt - 1;

for ( ; ; )
    {
        do_get_next = TRUE;

switch (loc_opt)
        {
            case ESCAPE :
                return;

case 0 :  /* Do wrap around */
                loc_opt = 2;
                do_get_next = FALSE;  /* Special Case */
                break;

case 1 :  /* Operator Timeout */
```

STD 617 PA                                                              - 67 -

```c
         rtn_val = get_time_out(&op_time_out, Operator_Time_Out);
         break;

case 2 : /* [exec] key timeout */
         rtn_val = get_time_out(&ex_time_out, Executive_Time_Out);

/* NOTE : should go with last case
         ** As part of last option, if press enter then done, otherwise
         ** might be looping
         */
         if (rtn_val == ENTER)
             return;

break;

case 3 : /* Do wrap around */
         loc_opt = 1;
         do_get_next = FALSE;  /* Special Case */
         break;

}  /* End of switch */

/* If timeout then ... */
   if (EXIT_EXEC || TIMEOUT)
      return;

/* Come back in synch with global curr_opt */
   curr_opt = loc_opt;
   if (do_get_next)
   {
      get_next_opt(rtn_val, &opt_direction);
      loc_opt = curr_opt;
   }

}  /* End for ;; */

/************************************************
 *
 *  NAME         :   get_time_out
 *
 *  WRITTEN BY   :   J. H. King
 *
 *  DESCRIPTION  :
 *       A generic routine used by opt. 23 to get the oper. and exec
 *       time out values.
 *
 *  PARAMETERS   :
 *       time_out_val   - address of the current time out value
 *       top_line       - top line display message
 *
 *  RETURNS      :
 *       0  - when an escape is pressed
 *       1  - when a valid timeout value has been entered
 *
 ************************************************/
byte get_time_out(byte *time_out_val, char top_line[])
{
   char tmp_str[3];
   byte rtn_val;

sprintf(tmp_str, exec_opt_23_1, (int)*time_out_val);
```

```c
         /* Valid keys: Enter, Esc, Clear, numerics */
         if (rtn_val = get_dsply_num(SCREEN_COLS, 2, 0x012F, tmp_str, top_line) == E
SCAPE)
             return(ESCAPE);

/* If a timeout occurred then exit ... */
         if (EXIT_EXEC)
             return(0);

*time_out_val = byte_atoi(tmp_str);

return(rtn_val);
}

/************************************************
 *
 *  NAME         :   exec_opt_24
 *
 *  WRITTEN BY   :   J. H. King
 *
 *  DESCRIPTION  :
 *       Process executive option 24
 *
 *  PARAMETERS   :
 *       none
 *
 *  RETURNS      :
 *       none
 *
 ************************************************/
void exec_opt_24(void)
{
   char rtn_val;

curr_opt = 1;

for (;;)
   {
      switch (curr_opt)
      {
      case ESCAPE :
         return;

case 0 : /* Do wrap around */
         curr_opt = 1;
         break;

case 1 : /* Do we want Oper Lock Outs ? */
         rtn_val = select_0_1(&op_lock_out, YES_NO, Enable_Oper_Lock_Out);

/* If no lock outs, then we are done */
         if (!op_lock_out)
         {
             LOCKOUT = FALSE;   /* Turn it off if it happens to be on. */
             return;
         }
         break;

case 2 : /* What is begin lockout time ? */
         rtn_val = ent_time(&op_lock_out_beg, Begin_Time, 0x00001);
         break;

case 3 : /* What is end lockout time ? */
         rtn_val = ent_time(&op_lock_out_end, End_Time, 0x00001);
```

STD 617 PA                                     - 68 -

```
04/04/1995 11:09          Filename: OPT20_25.C                    Page 19

/* NOTE : should go with last case :
           ** As part of last option, if press enter then done, otherwise
           ** might be looping.
           */
           if (rtn_val == ENTER)
               return;

break;

case 4 : /* Do wrap_around */
           curr_opt = 1;
           break;
       } /* End of switch */

/* if timeout then ..... */
       if (EXIT_EXEC || TIMEOUT)
           return;
   } /* End of for ; ; */
}

/***************************************************************
**
** NAME           : exec_opt_25
**
** WRITTEN BY     : Susan Martinez
**
** DESCRIPTION    : Process executive option 25.
**
** PARAMETERS     :
**   none
**
** RETURNS        :
**   none
**
***************************************************************/
void exec_opt_25(void)
{
   char rtn_val;

curr_opt = 1;

for ( ; ; )
   {
       switch (curr_opt)
       {
       case ESCAPE :
           return;

case 0 : /* Do wrap_around */
           curr_opt = 2;
           break;

case 1 : /* Setup change calc */
           rtn_val = select_0_1(&change_calc_req, REQUIRED_MENU, CHANGE_CALCULAT
ION);
           break;

case 2 : /* Setup change calc */
           rtn_val = select_0_1(&key_reset_dsply, REQUIRED_MENU, KEY_TO_RESET_DI
SPLAY);
```

```
04/04/1995 11:09          Filename: OPT20_25.C                    Page 20

/* NOTE : should go with last case :
           ** As part of last option, if press enter then done, otherwise
           ** might be looping.
           */
           if (rtn_val == ENTER)
               return;

break;

case 3 : /* Do wrap_around */
           curr_opt = 1;
           break;
       } /* End of switch */

/* if timeout then ..... */
       if (EXIT_EXEC || TIMEOUT)
           return;
   } /* End of for ; ; */
}

/***************************************************************
** find_menu
**
** Parameters :
**   menu_number : number to search for in type menu
**   opt_pos     : will be adjusted to point to found menu or reset to
**                 top if it could not be found
**
** Return
**   TRUE  : found the passed in menu number
**   FALSE : did not    "   "    "    "    "
**
***************************************************************/
int find_menu(int *menu_number, int *opt_pos)
{
   int i;

/* Check if entered a valid menu number */
   for (i = 0; i < MAXOPTS; i++)
   {
       /* Note : Setup is special - can't grant access to it */
       if (i != SETUP_MENU - 1 &&
           *menu_number == (int)exec[i].opt_num)
       {
           /* Eureka ! I've found it */
           *opt_pos = i;
           return(TRUE);
       }
   } /* End for */

/* If we are here, then we DID NOT find the menu number */
   /* Reset pointers */
   *opt_pos = 0;
   *menu_number = (int)exec[*opt_pos].opt_num;
   return(FALSE);
}

/******************************* END OF OPT20_25.C *******************************/
```

What is claimed is:

1. A document dispenser comprising:
   a digital controller for controlling the operation of the dispenser;
   a document printer controlled by said digital controller;
   a security signal production device;
   a security controller adapted to permit operation of the dispenser in a first security mode when a first predetermined security signal is produced by said security signal production device, to inhibit operation of the dispenser in said first security mode when said first predetermined security signal is not produced by said security signal production device, to permit operation of the dispenser in a second security mode when a second predetermined security signal is produced by said security signal production device, to inhibit operation of the dispenser in said second security mode when said second predetermined security signal is not produced by said security signal production device, and to permit operation of the dispenser in at least one of said first and second security modes upon receipt of a downloaded security controller override command without regard to whether one of said first and second predetermined security signals is produced by said security signal production device; and
   a data input port adapted to receive said downloaded override command and to transfer said downloaded override command to said security controller.

2. A document dispenser as claimed in claim 1, wherein the security controller permits operation in said first security mode when a first security signal is produced by said production device, permits operation in said second security mode when a second security signal is produced by said production device, permits operation of the dispenser in said first security mode upon receipt of a first downloaded security controller override command, permits operation of the dispenser in said second security mode upon receipt of a second downloaded security controller override command, and permits operation of the dispenser in said first and second security modes upon receipt of a third downloaded security controller override command.

3. A document dispenser as claimed in claim 1, wherein, upon receipt of said override command, said security controller permits a predetermined number of reentries into a selected security mode following a termination of operation in said selected security mode.

4. A document dispenser as claimed in claim 1, wherein, upon receipt of said override command, said security controller does not permit reentry into a selected security mode following a termination of operation in said selected security mode.

5. A document dispenser as claimed in claim 1, wherein said security controller comprises an electronic memory device for storing a plurality of security level entry codes and for sending an operation signal output to the digital controller indicative of whether operation in a particular security level is to be permitted or inhibited.

6. A document dispenser as claimed in claim 1, wherein the security controller comprises electronic circuitry for sending an operation signal command to the digital controller permitting operation in a particular security level in response to said security controller override command.

7. A document dispenser as claimed in claim 1, wherein the security controller comprises electronic circuitry for sending an operation signal command to the digital controller permitting operation in a plurality of security levels in response to said security controller override command.

8. A document dispenser as claimed in claim 1, wherein said data input port comprises a communications port.

9. A document dispenser as claimed in claim 1, wherein said security signal production device comprises a mechanical or electronic component for producing or detecting an electronic signal and transferring the signal to the security controller.

10. A document dispenser as claimed in claim 1, wherein said security signal production device comprises a keyboard for entering a preselected key sequence.

11. A document dispenser as claimed in claim 1, wherein said security signal production device comprises a decoder for reading an optically or magnetically encoded object carrying encoded information indicative of said security signal.

12. A document dispenser as claimed in claim 1, wherein said security signal production device comprises a switch for producing said security signal in response to activation by a mechanically cut key.

13. A document dispenser as claimed in claim 1, wherein said security signal production device comprises a data input port for receiving the security signal and transferring the signal to the security controller.

14. A document dispenser as claimed in claim 1, further comprising at least one security mode entry command producing device, whereby, when operation in a selected security mode is permitted, entry into said selected security mode is achieved by activating said entry command producing device.

15. A document dispenser as claimed in claim 14, wherein said command producing device comprises a mechanical or electronic component capable of sending a signal to the digital controller.

16. A method of dispensing documents comprising the steps of:
    providing a document dispenser wherein access to a first security mode is permitted by a security controller when a first predetermined security signal is produced by a security signal production device, wherein access to a second security mode is permitted by said security controller when a second predetermined security signal is produced by said security signal production device, wherein access to said first security mode is inhibited by said security controller when said first predetermined security signal is not produced by said security signal production device, and wherein access to said second security mode is inhibited by said security controller when said second predetermined security signal is not produced by said security signal production device;
    providing a command transfer device; and
    downloading a security controller override command from said command transfer device to said document dispenser, wherein access to one of said first security mode and said second security mode is permitted upon receipt of said downloaded security controller override command from said command transfer device without regard to whether one of said first and second predetermined security signals is produced by said security signal production device.

17. A method of dispensing documents as claimed in claim 16, wherein said command transfer device comprises a host computer.

18. A method of dispensing documents as claimed in claim 17, wherein said command transfer device is located remote from said dispenser.

19. A method of dispensing documents as claimed in claim 17, wherein said command transfer device is connected to said dispenser locally.

20. A method of dispensing documents comprising the steps of:

providing a document dispenser including a digital controller for controlling the operation of the dispenser and a document printer;

providing a security signal production device;

providing a security controller in communication with said security signal production device;

permitting operation of the dispenser in a first security mode when a first predetermined security signal is produced by said security signal production device and transferred to said security controller;

permitting operation of the dispenser in a second security mode when a second predetermined security signal is produced by said security signal production device and transferred to said security controller;

inhibiting operation of the dispenser in said first security mode when said first predetermined security signal is not produced by said security signal production device;

inhibiting operation of the dispenser in said second security mode when said second predetermined security signal is not produced by said security signal production device; and permitting operation of the dispenser in at least one of said first and second security modes upon receipt by said document dispenser of a downloaded security controller override command without regard to whether one of said first and second predetermined security signals is produced by said security signal production device.

* * * * *